United States Patent
Singer et al.

(10) Patent No.: US 6,834,298 B1
(45) Date of Patent: Dec. 21, 2004

(54) SYSTEM AND METHOD FOR NETWORK AUTO-DISCOVERY AND CONFIGURATION

(75) Inventors: Tyson A. Singer, San Jose, CA (US); Steven L. Christenson, Campbell, CA (US); Beejan Beheshti, Hillsborough, CA (US)

(73) Assignee: Siemens Information and Communication Networks, Inc., Boca Raton, FL (US)

( * ) Notice: Subject to any disclaimer, the term of this patent is extended or adjusted under 35 U.S.C. 154(b) by 0 days.

(21) Appl. No.: 09/399,902

(22) Filed: Sep. 21, 1999

(51) Int. Cl.[7] .............................................. G06F 15/177
(52) U.S. Cl. ....................... 709/220; 709/223; 709/224
(58) Field of Search ................................ 709/223, 224, 709/220

(56) References Cited

U.S. PATENT DOCUMENTS

| | | | | |
|---|---|---|---|---|
| 5,491,791 A | * | 2/1996 | Glowny et al. | 714/37 |
| 5,539,881 A | * | 7/1996 | Hunt et al. | 709/242 |
| 5,710,885 A | * | 1/1998 | Bondi | 709/224 |
| 5,835,720 A | * | 11/1998 | Nelson et al. | 709/224 |
| 5,968,116 A | * | 10/1999 | Day, II et al. | 709/202 |
| 6,023,507 A | * | 2/2000 | Wookey | 380/21 |
| 6,058,103 A | * | 5/2000 | Henderson et al. | 370/254 |
| 6,167,358 A | * | 12/2000 | Othmer et al. | 702/188 |
| 6,192,034 B1 | * | 2/2001 | Hsieh et al. | 370/241 |
| 6,259,679 B1 | * | 7/2001 | Henderson et al. | 370/254 |
| 6,269,397 B1 | * | 7/2001 | Pirhonen | 709/223 |
| 6,282,175 B1 | * | 8/2001 | Steele et al. | 370/254 |
| 6,308,205 B1 | * | 10/2001 | Carcerano et al. | 709/221 |
| 6,377,987 B1 | * | 4/2002 | Kracht | 709/220 |
| 6,389,464 B1 | * | 5/2002 | Krishnamurthy et al. | 709/220 |
| 6,490,617 B1 | * | 12/2002 | Hemphill et al. | 709/223 |
| 6,553,423 B1 | * | 4/2003 | Chen | 709/230 |

* cited by examiner

Primary Examiner—Saleh Najjar

(57) ABSTRACT

A Network Auto-Discovery service is provided. In operation, an administrator inputs a set of IP (Internet Protocol) address ranges inside which the distributed system exists. The Auto-Discovery Unit (104) steps through the IP addresses in the ranges testing each one to determine if there is a machine at that IP address. If a machine is found at that address, an exploration process is begun. First, attempts are made to contact a Responder (112) on the machine. If one exists, the Responder (112) accepts the configuration information provided to it. Then the Responder (112) returns a set of objects that describe the hardware and software components of that machine. The returned information contains a list of management applications associated with system components. The Auto-Discovery Unit (104) then stores this information. The location and exploration process is repeated at scheduled intervals indefinitely.

15 Claims, 18 Drawing Sheets

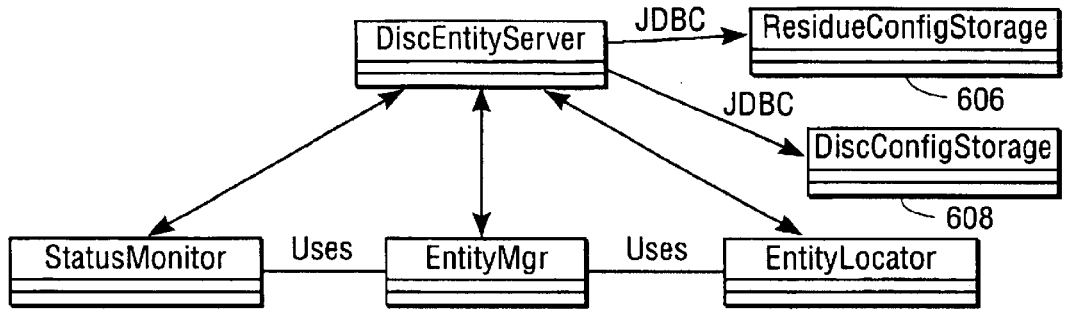
FIG. 6 High Level Classes in Disc Application
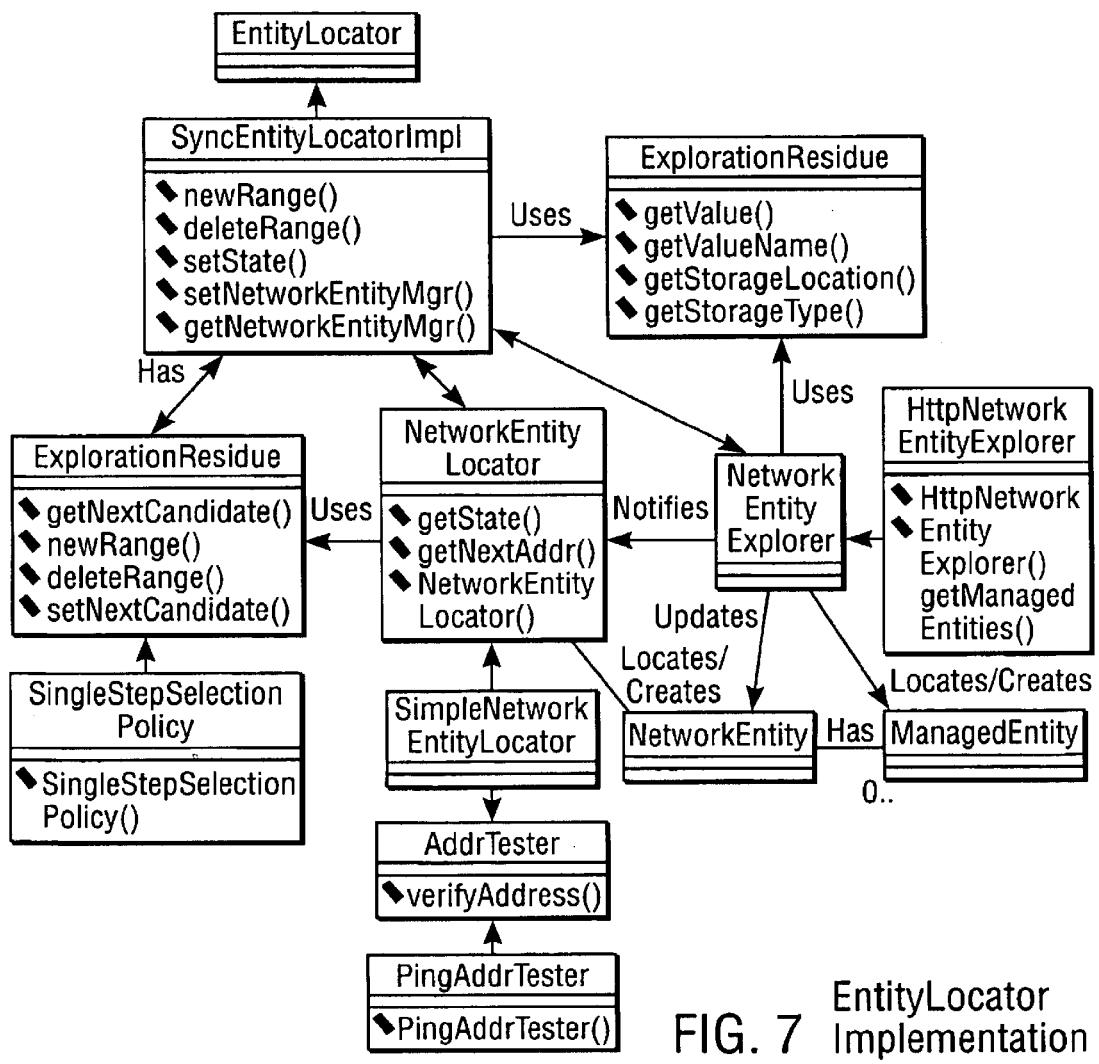
FIG. 7 EntityLocator Implementation

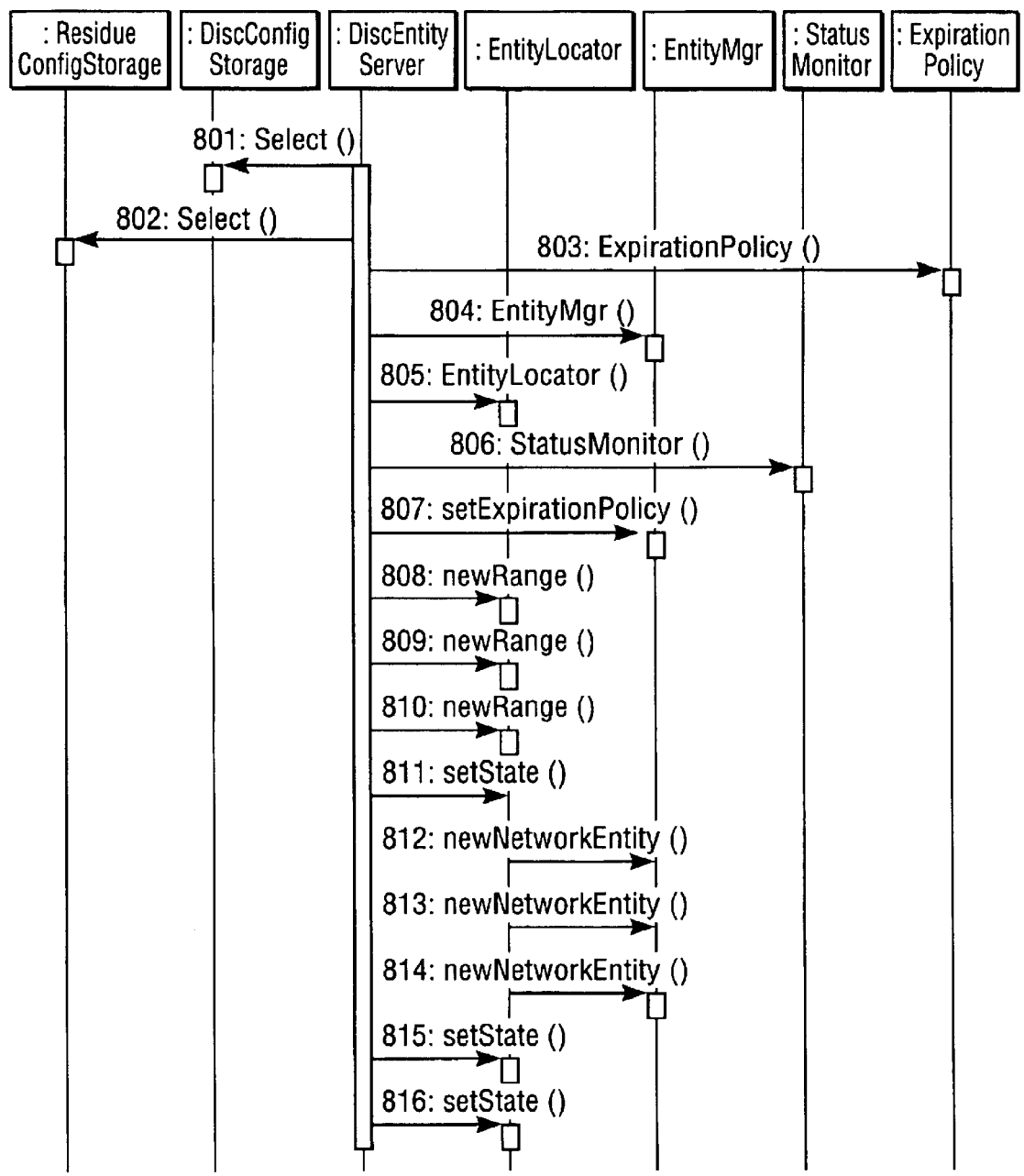
FIG. 8 Starting and Running the DiscEntityServer

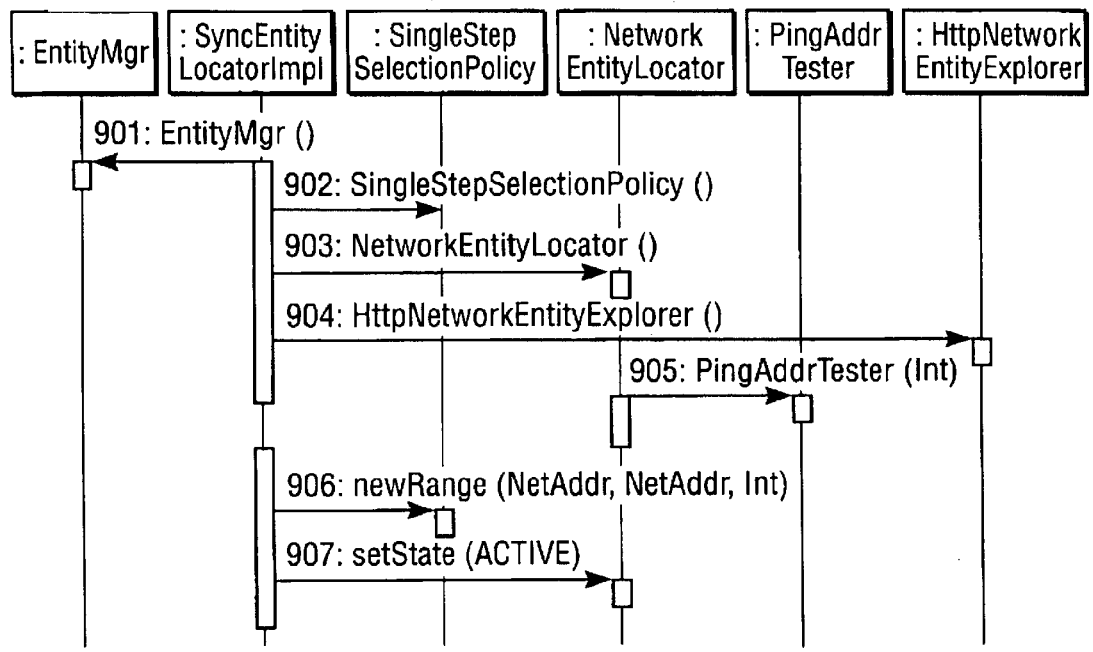
FIG. 9 Initialization of the EntityLocator
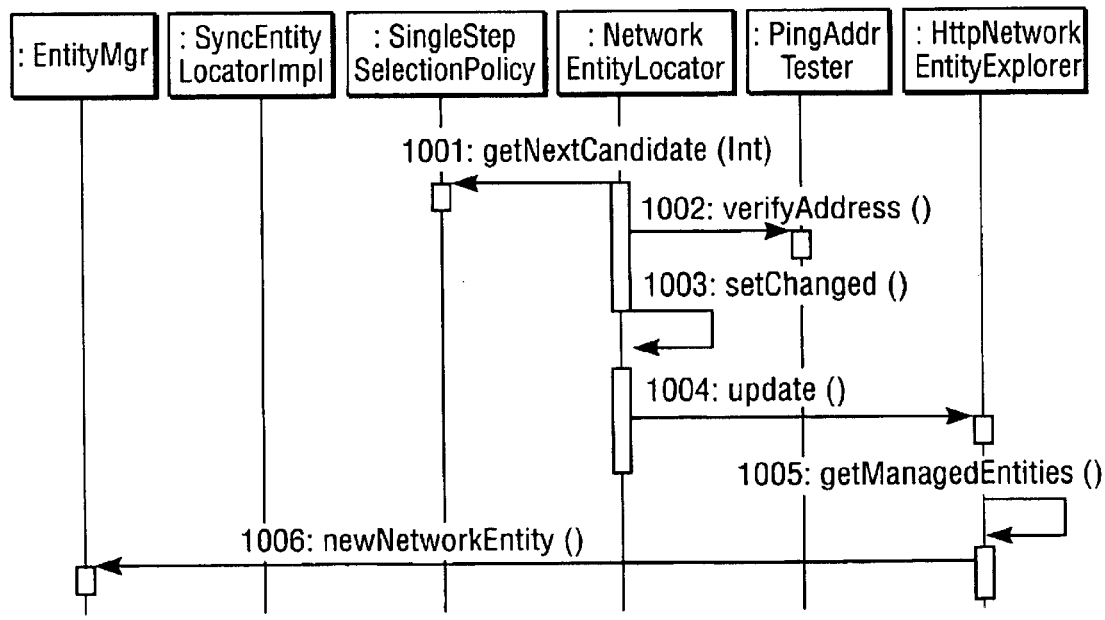
FIG. 10 An Iteration in the Location Process

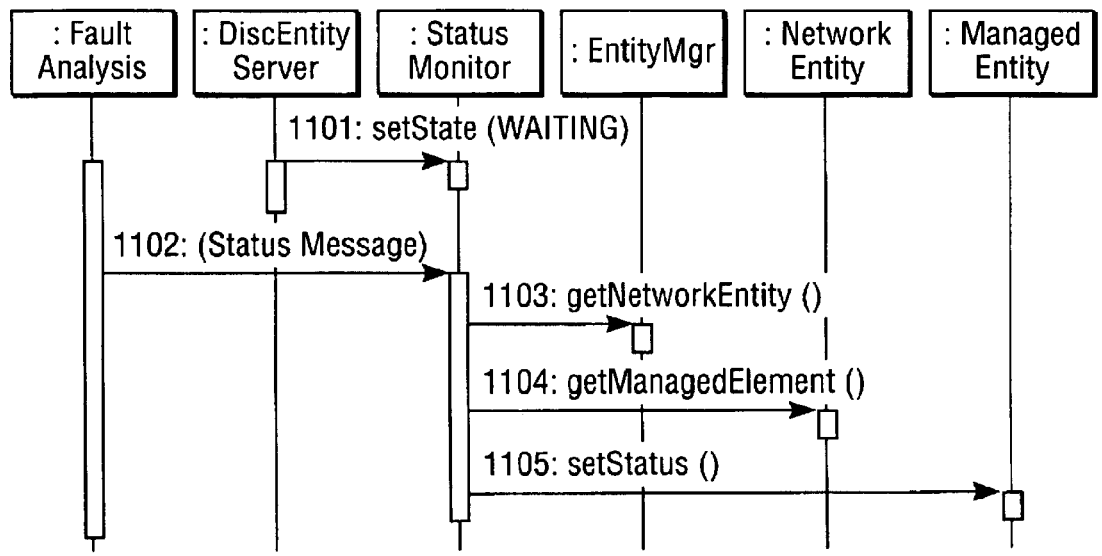
FIG. 11 StatusMonitor
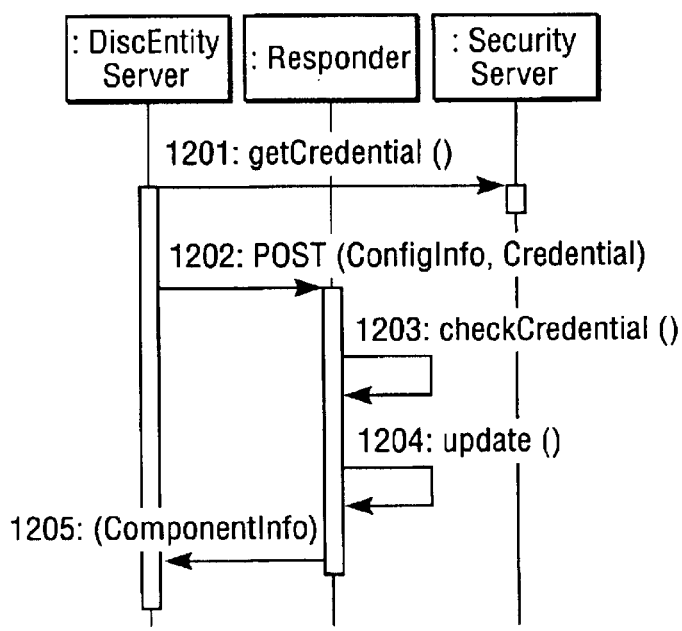
FIG. 12 Discovering and Updating a Responder

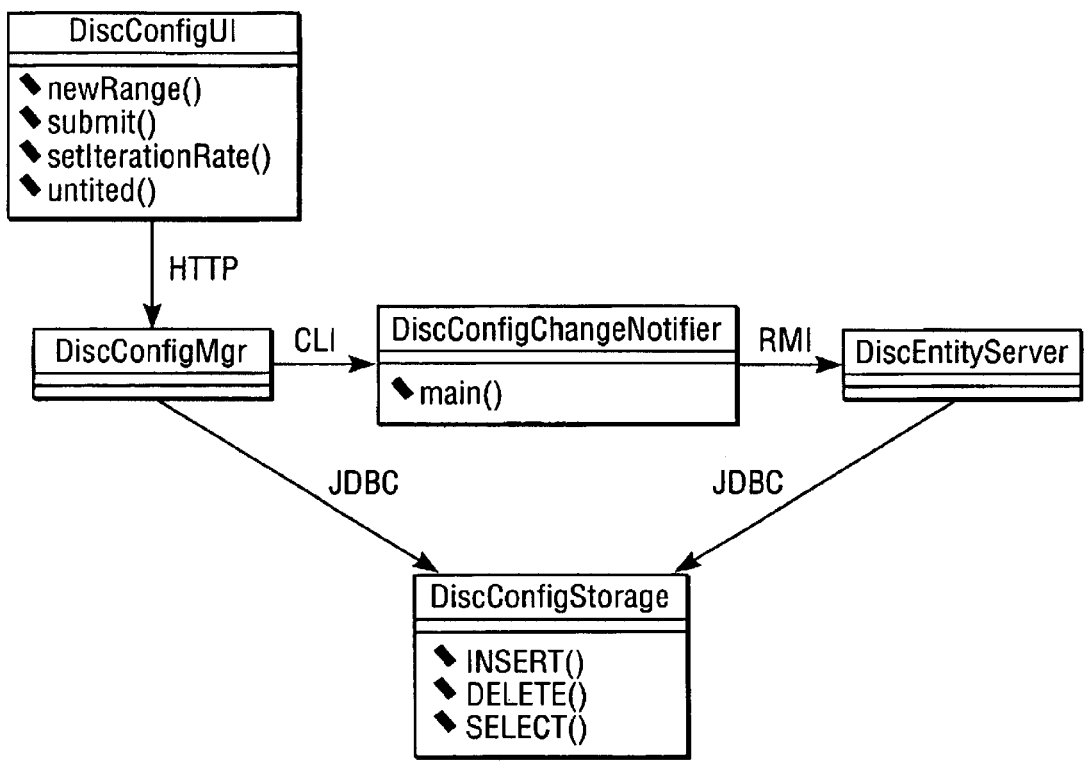
FIG. 13 DiscConfig communications methods

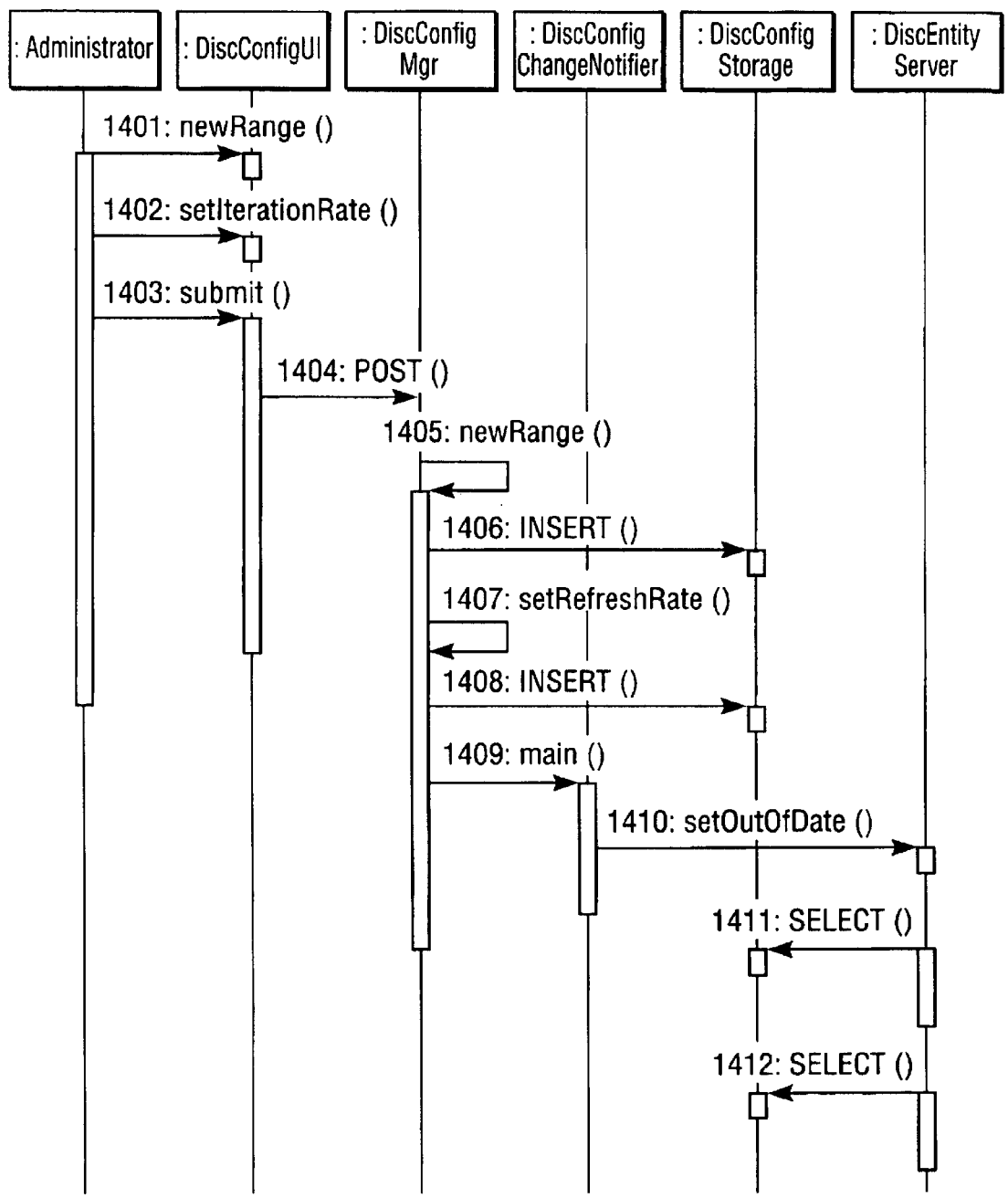
FIG. 14 Changing the configuration values

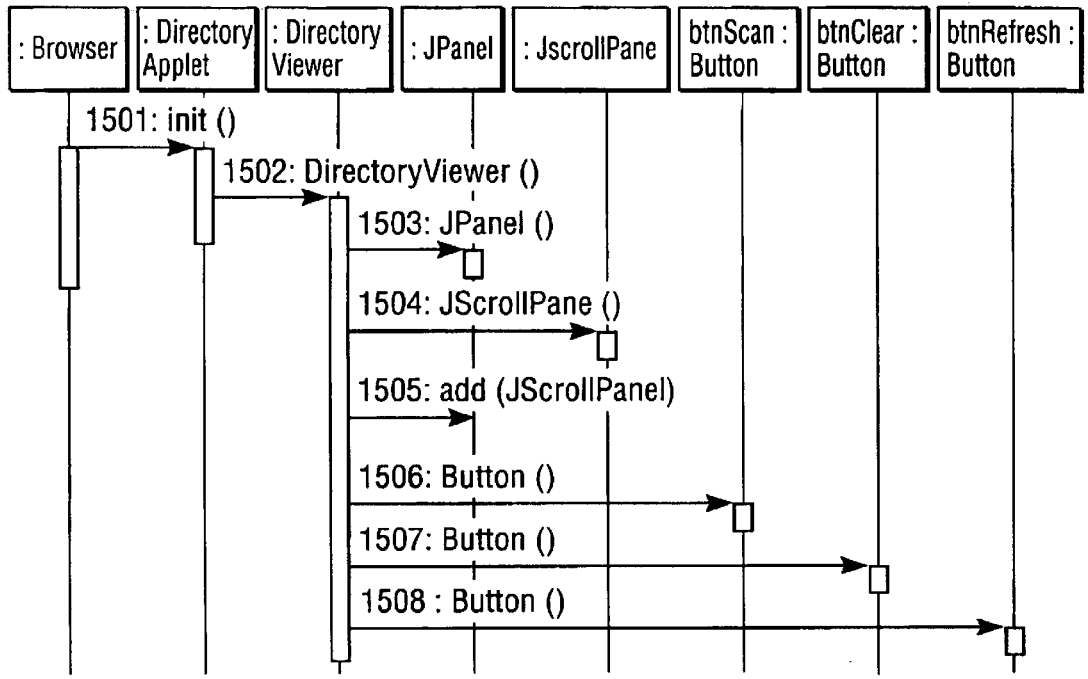
FIG. 15 GUI initialzation
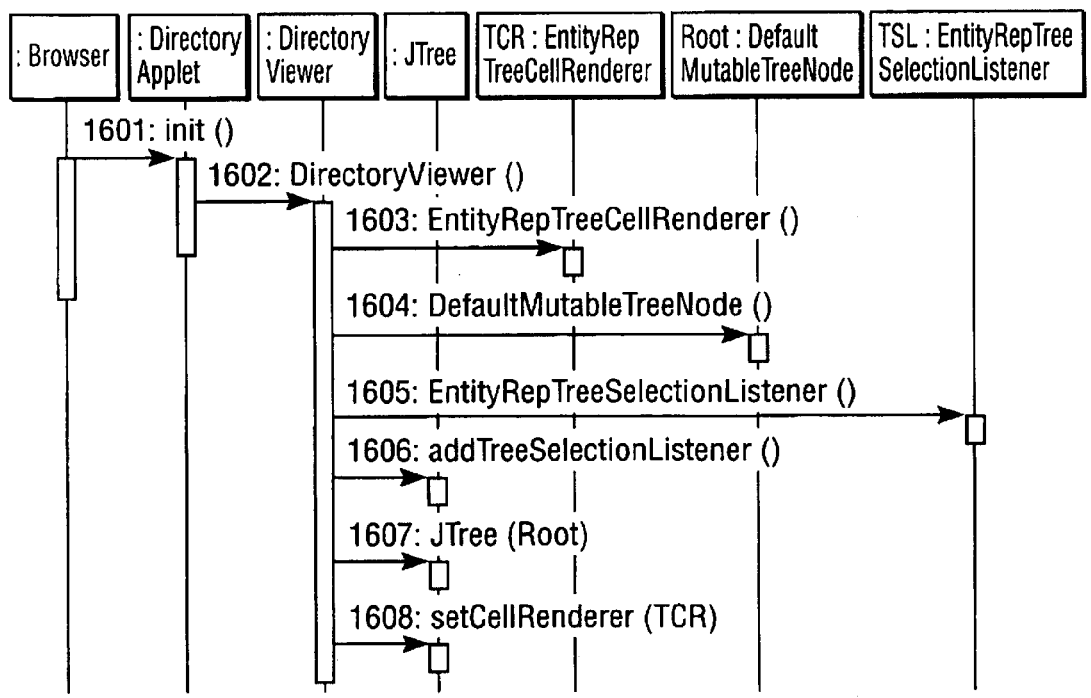
FIG. 16 Directory Initialization

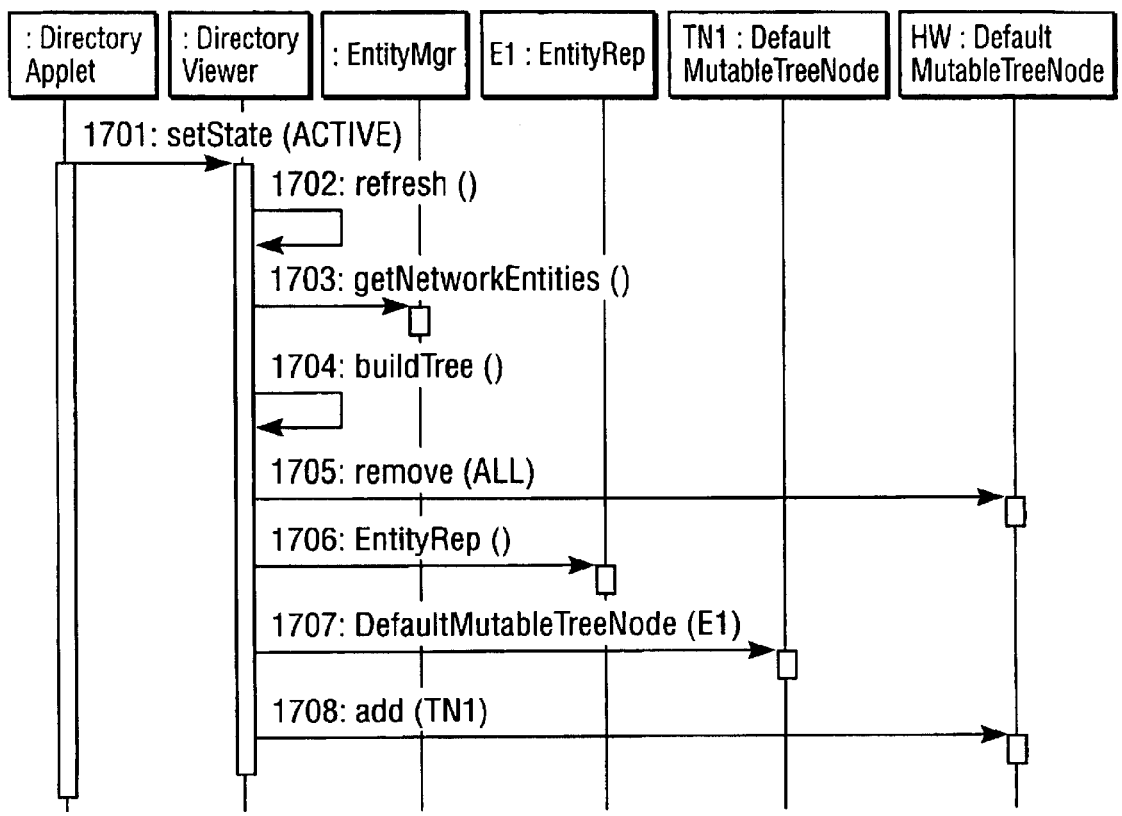
FIG. 17 Building the Directory
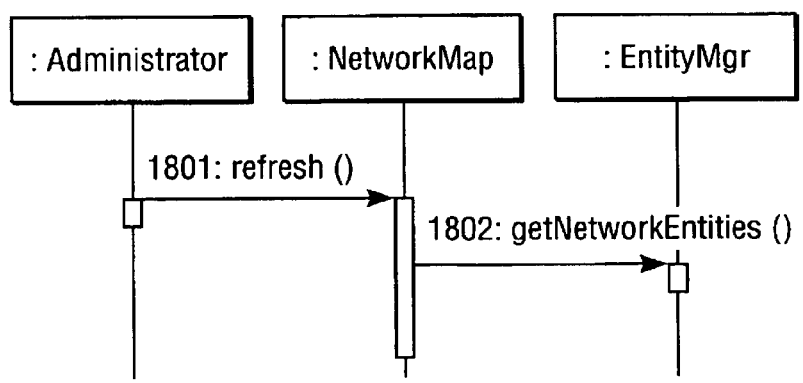
FIG. 18A Fetching the list of NetworkEntities

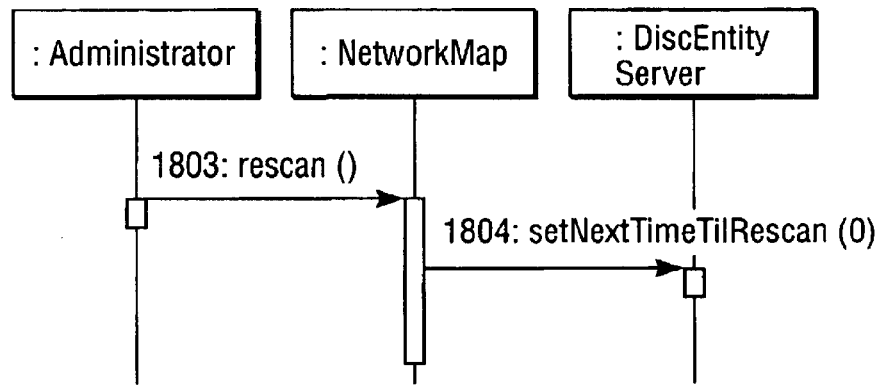
FIG. 18B Telling the DiscEntityServer to Rescan the network
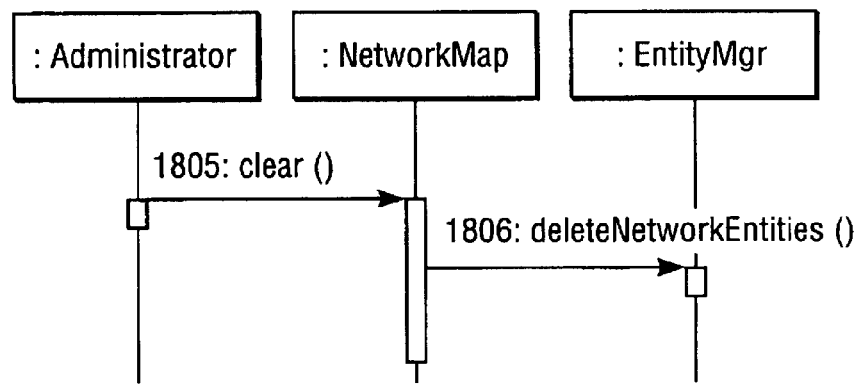
FIG. 18C Clearing the storage of all found NetworkEntities

SYSTEM AND METHOD FOR NETWORK AUTO-DISCOVERY AND CONFIGURATION

BACKGROUND OF THE INVENTION

1. Field of the Invention

The present invention relates to network systems, and in particular, to network management.

2. Description of the Related Art

Complex software systems today are often distributed throughout a network of computers within a local area network (LAN) or wide area network (WAN). Components of such a system may be added, removed, or moved to different machines throughout the lifetime of the system. Moreover, the software components of such systems must often interact with one another across machine boundaries. To do so, the components must know the location and availability of the various other components in the system. Finally, configuration management or fault analysis of each of the components in the system is required.

To provide for location and monitoring of components, typically a simple network management protocol (SNMP) based system is used. However, this requires an SNMP agent on every machine. Moreover, SNMP employs ports that are not typically accessible through a firewall, preventing location of entities that exist past the firewall.

For configuration, each machine must be manually configured to know the location of other components. However, manual configuration is expensive and error prone. Alternatively, a multicasting technique may be employed wherein a component multicasts a request to another component and hopes the other components hear the request and respond. While multicasting is an efficient mechanism, multicasting is not fully supported in many LAN environments and is limited by routers that do not forward multicast packets.

Finally, to manage the components of a system, typically, a central management server is provided for the management application. The system administrator must then know where the management application is and what its name and interface are. Moreover, if component software is upgraded, the management software must also be upgraded. Further, centralized management limits the ability to distribute management applications.

SUMMARY OF THE INVENTION

These and other drawbacks in the prior art are overcome in large part by a system and method according to the present invention. An Auto-Discovery Unit is provided wherein an administrator may input a series of internal Protocol (IP) addresses inside which the system exists. The Auto-discovery Unit steps through the IP addresses testing to determine whether a machine exists at the address. If a machine is found, an exploration process is undertaken wherein attempts are made to contact a Responder Unit on each machine. The Responder Unit accepts configuration information and returns a set of objects describing the hardware and software components of the machine. The Auto-Discovery Unit then stores this information. The process is repeated automatically at scheduled intervals.

Broadly speaking, the present invention relates to a network management system including a server having an auto-discovery unit for automatically determining the presence of system components and notifying other components of system requirements. A graphical user interface (GUI) including a network map is maintained for supervising operation of the auto-discovery system. The auto-discovery service is accessible remotely, such as via the World Wide Web.

BRIEF DESCRIPTION OF THE DRAWINGS

A better understanding of the invention is obtained when the following detailed description is considered in conjunction with the following drawings in which:

FIG. 6 is a diagram illustrating high level classes for an implementation of the Discovery Service according to the present invention;

FIG. 7 is a diagram illustrating a software object which searches IP addresses according to the embodiment of FIG. 6;

FIG. 8 is a chart showing program flow for a DiscEntityServer according to an embodiment of the invention;

FIG. 9 is a diagram of flow for initialization of the EntityLocator;

FIG. 10 is a diagram of an iteration of the location process;

FIG. 11 is a diagram of the message sequence used to update the status of a particular ManagedEntity;

FIG. 12 is a diagram of the message sequence for discovering and updating a Responder;

FIG. 13 is a diagram illustrating the DiscConfig Communication methods;

FIG. 14 is a diagram illustrating message sequence for changing the configuration values;

FIG. 15 is a diagram illustrating GUI initialization;

FIG. 16 is a diagram illustrating directory initialization;

FIG. 17 is a diagram illustrating message flow for building the directory;

FIGS. 18A–C are diagrams illustrating message flow for administrator interaction with the applet component of the map.

DETAILED DESCRIPTION OF THE INVENTION

Figure 1:
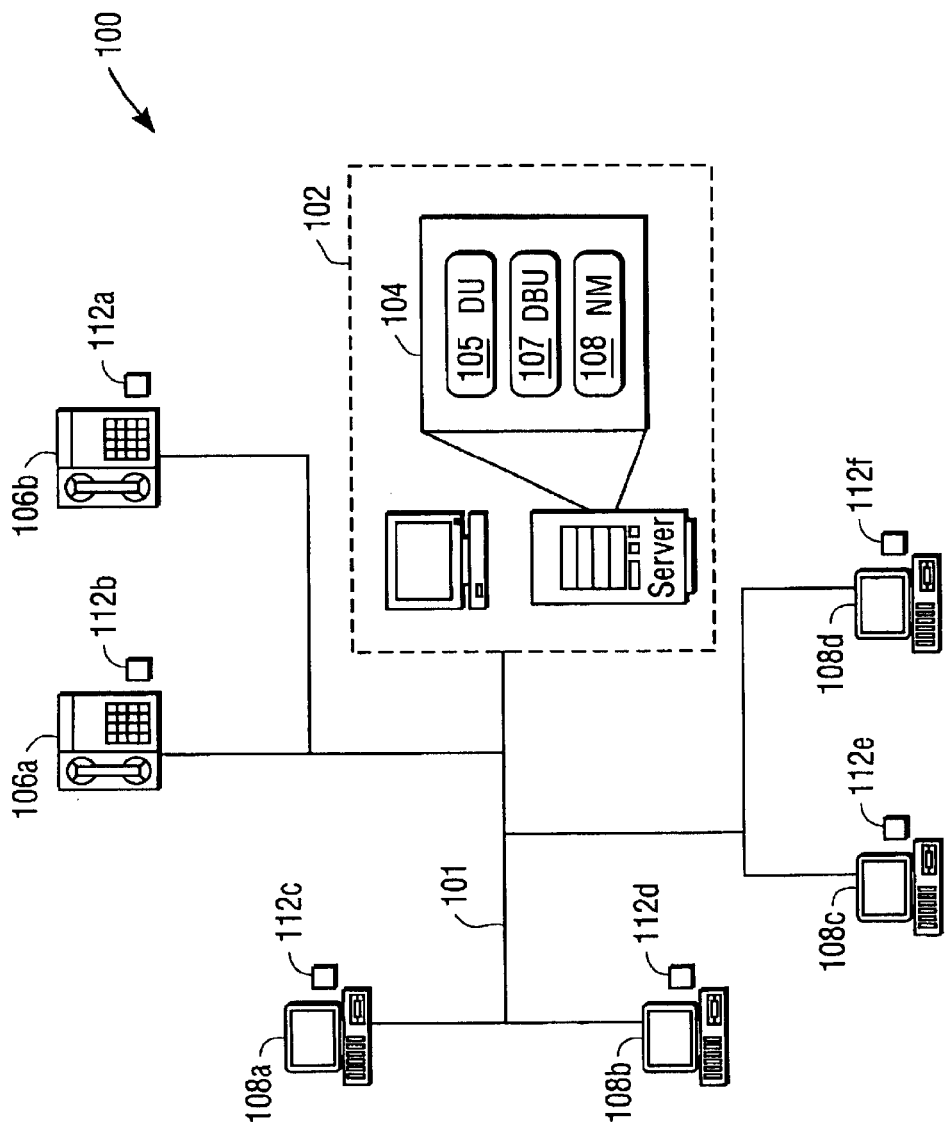
FIG. 1 is a diagram illustrating a telecommunications system according to an embodiment of the invention.

Turning now to the drawings and with particular attention to FIG. 1, an exemplary telecommunications system 100 employing an Auto-Discovery Service according to an embodiment of the present invention is shown. The telecommunications system 100 includes a server 102 including an Auto-Discovery Unit 104 according to the present invention. The telecommunications system according to the embodiment illustrated includes a packet network such as a local area network (LAN) 101 to which are coupled a plurality of telephony clients. The telephony clients may be embodied, for example, as stand-alone telephones 106a, 106b, or personal computers 108a–108d with telephony functionality. Each telephony client is provided with a Responder Unit 112a–112f, according to the present invention, for providing configuration responses to the Auto-Discovery Unit 104. The server 102 and the telephony clients may communicate with one another using any of a variety of protocols, such as TCP/IP.

The Auto-Discovery Unit 104 includes a Discovery Unit 105 and a Database Unit 107. The Discovery Unit 105 is responsible for locating other components in the system and distributing configuration information. The Database Unit 107 maintains a central depository of system layout and management configuration information. Such information may include, for example, cross-references to which components require information concerning the configuration of other components. Finally, the server 102 may support a Network Map 109 which provides a graphical view of the system. The Network Map 109 may typically be accessed via any client terminal with a graphical user interface. An exemplary server including a network auto-discovery functionality according to the present invention is the HiNet™ RC 3000 system, available from Siemens, which is hereby incorporated by reference in its entirety as if fully set forth herein.

The Responders 112a–112f respond to discovery inquiries from the Auto-Discovery Unit 104 with information pertaining to the hardware and software on the machine and information about located management tools. In addition, the Responders 112a–112f accept and store configuration information provided by the Auto-Discovery Unit 104.

In operation, an administrator interacts with an applet component of a network map to input a set of IP (Internet Protocol) address ranges inside which the system exists. The Auto-Discovery Unit 104 steps through the IP addresses in the ranges testing each one to determine if there is a machine at that IP address. A mechanism such as a ping may be employed if a machine is found at that address an exploration process is begun. First, attempts are made to contact the Responder 112 on the machine. If one exists, the Responder 112 accepts the configuration information provided to it. Then the Responder 112 returns a set of objects that describe the hardware and software components of that machine. The returned information contains a list of management applications associated with system components. The Auto-Discovery Unit 105 then stores this information. The location and exploration process is repeated at scheduled intervals indefinitely.

The configuration information that is distributed to the Responders 112 is gathered dynamically. When a system component is discovered, the Auto-Discovery Unit 104 determines whether any other component is interested in this type of data. If so, this specific information is added to the distributed information. For example, assume componet A is interested the location of component B. After component B is located, then the next time component A is located, it will be told the location of component B. Furthermore, component B maybe moved to another machine at some point. When component B is discovered again at that new location, component A will be notified of the new location of component B. The system can either be pre-configured with the type of information that components are interested in or it can be set by the administrator.

To maintain protocol independence in the discovery and exploration process, the Auto-Discovery Service according to an embodiment of the invention works with a protocol handler class. The Auto-Discovery Service merely knows how to interact with the protocol handler interface. A specific implementation of the interface then handles a specific protocol. The concrete protocol handler class is customized to interact with the Responder. For example, the protocol handler class could be based on HTTP and the Responder could be a HTTP server with a cgi-bin script to accept configuration information and return the objects in XML format.

As will be explained in greater detail below, the Network Map 109 may be a web-based user interface. It queries the central repository or database 107 of the Auto-Discovery Service for a list of the components in the system. It then displays the components in a hierarchical layout. When a component is selected, it displays the properties of the component. Additionally, it displays the links to the management applications associated with the component.

Figure 2:
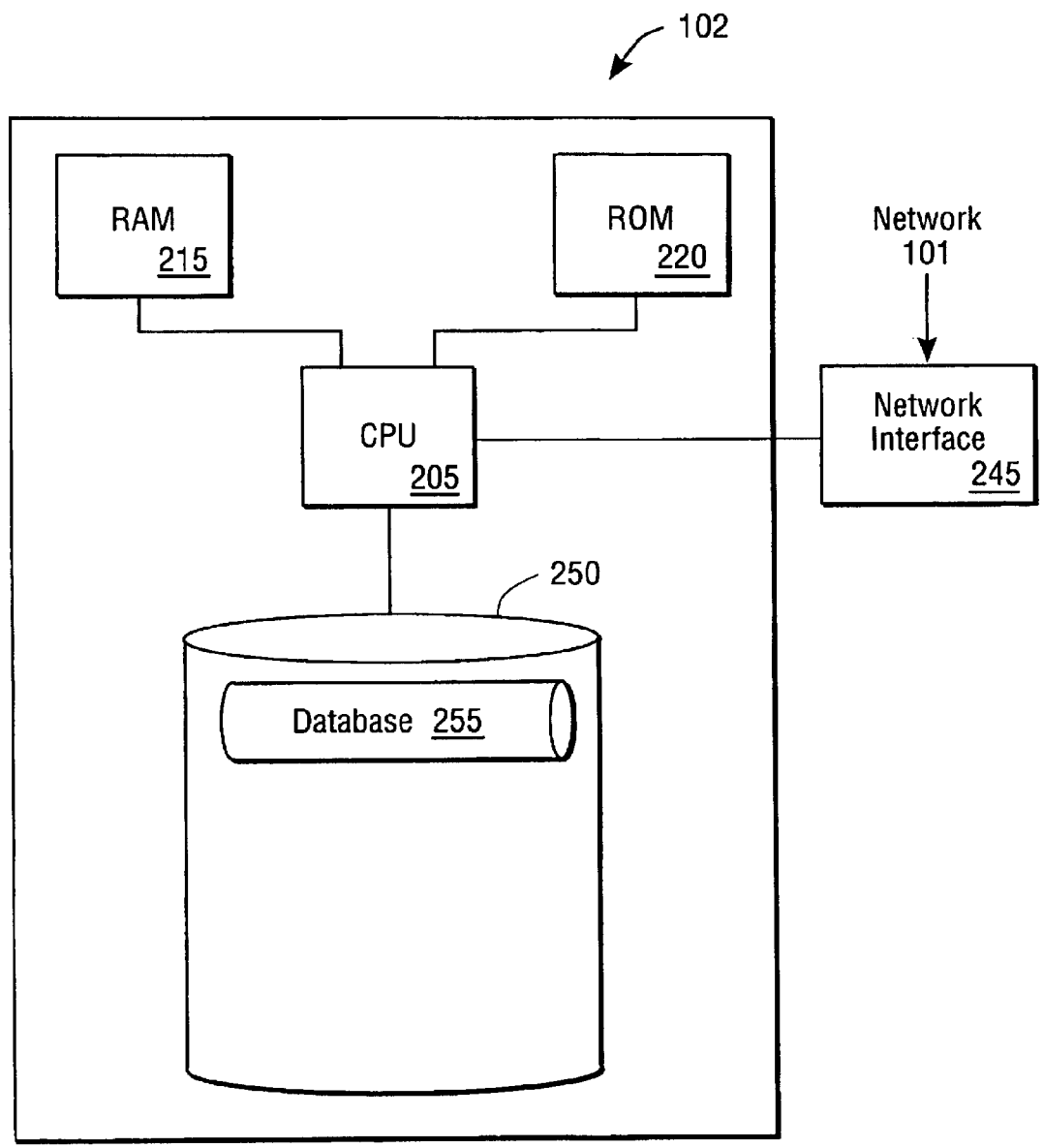
FIG. 2 is a block diagram illustrating an exemplary server according to an embodiment of the invention.

A block diagram of an exemplary server 102 according to an embodiment of the invention is shown in FIG. 2. The server 102 includes a central processing unit (CPU) 205 which is coupled to a random access memory (RAM) 215, a read only memory (ROM) 220, a network interface 245, and a data storage device 250. The data storage device 250 includes one or more databases 255 for storing information related to the network configuration, as well as program instructions (not shown) for the CPU 205. The database in the data storage device 250 may be implemented as a standard relational database capable of, for example, supporting, searching, and storing text information.

The CPU 205 executes Auto-Discovery Service program instructions stored in the RAM 215, ROM 220, and the data storage device 250 to perform the various Auto-Discovery Service functions described below, including Discovery, Configuration, and Network Map. The CPU 205 receives telephony device configuration data from the network 101 through the network interface 245 and stores the received data in the database 255.

The CPU 205 may be embodied as a conventional high-speed processor capable of executing program instructions to perform the functions described herein. Although the Auto-Discovery Service functionality may be implemented with a single CPU 205, in alternative embodiments, the Auto-Discovery Service could be implemented with a plurality of processors operating in parallel or in series.

The RAM 215 and ROM 220 may be standard commercially-available integrated circuit chips. The data storage device 250 may be embodied as static memory capable of storing large volumes of data, such as one or more floppy disks, hard disks, compact discs (CD), digital versatile disks (DVD), or magnetic tapes.

The network interface 245 connects the CPU 205 to the network 101. The network interface 245 receives data streams from the CPU 205 and the network 101 formatted according to respective communication protocols. The interface 245 reformats the data streams appropriately and relays the data streams to the network 101 and the CPU 205, respectively. The interface 245 may accommodate several different communication protocols.

Figure 3:
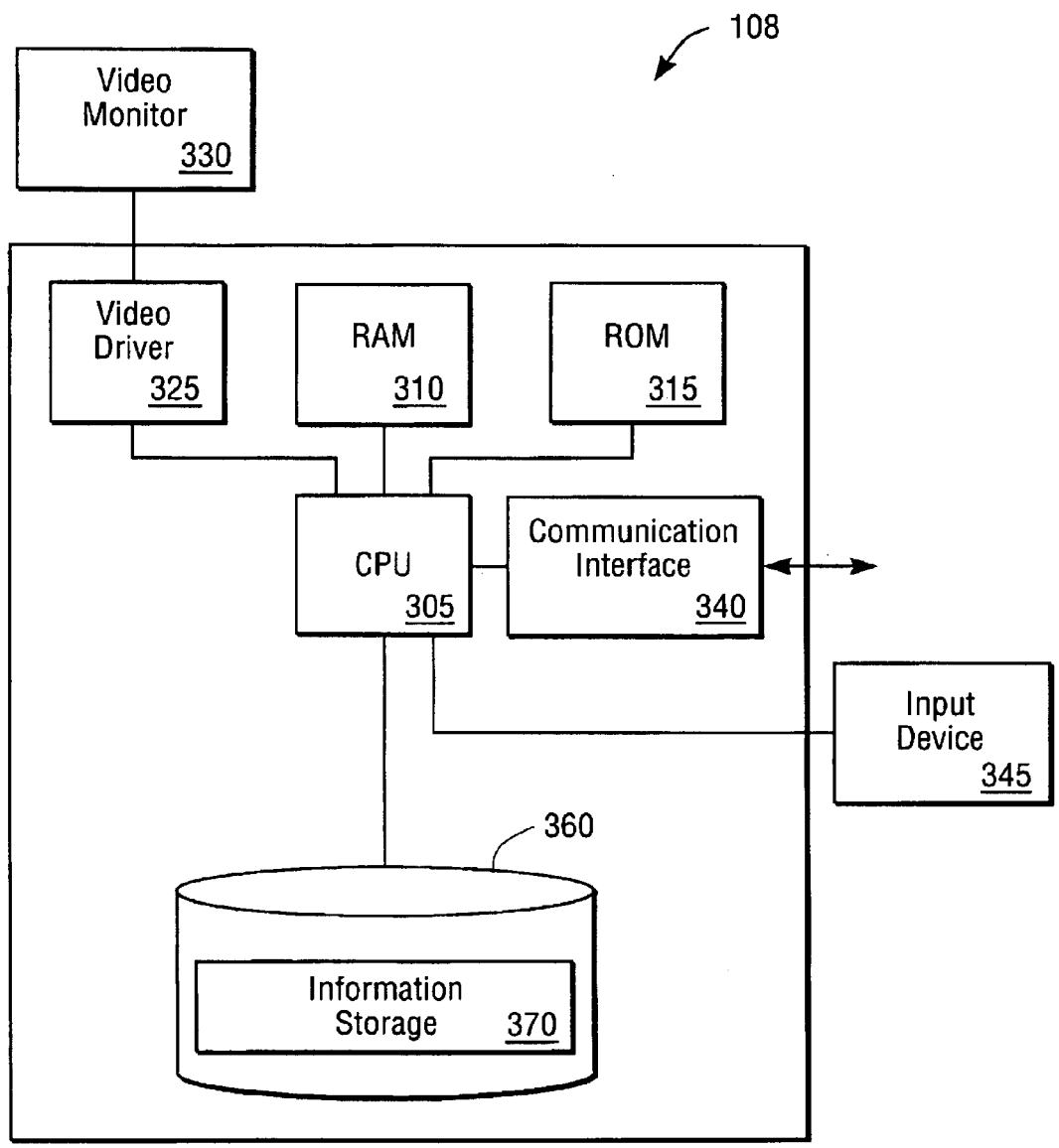
FIG. 3 is a block diagram of an exemplary telephony device according to an embodiment of the invention.

FIG. 3 illustrates a block diagram of a party terminal or telephony device 108, according to one embodiment of the invention. The telephony device 108 includes a CPU 305, which is connected to RAM 310, ROM 315, a video driver 325, a communication interface 340 which connects to the network 101, an input device 345, and a data storage device 360. A video monitor 330 is connected to the video driver 325.

The CPU 305 executes program instructions stored in RAM 310, ROM 315, and the information storage 370 to carry out various functions associated with the terminal 108. In particular, the CPU 305 thus is programmed to implement the Responders 112 according to the present invention for example, as an HTTP server supporting cgi-bin or similar script. The CPU 305 is programmed to receive data from the input device 345, receive data from the communication port 340, output received data to the video driver 325 for display on the video monitor 330, and output data to the communication port 340 for transmission to the network 101. Moreover, the CPU 305 may be programmed to access the Auto-Discovery Unit 104 on the server 102 such that configuration information may be updated remotely, i.e., without needing to be on site with the server 102.

The CPU 305 may be embodied as a high-speed processor capable of performing the functions described herein. The RAM 310 and ROM 315 may be embodied as standard commercially-available integrated circuit chips. The information storage 370 may be static memory capable of storing large volumes of data, such as one or more of floppy disks, hard disks, CDs, or magnetic tapes. The information storage 370 stores program instructions and received data.

The video driver 325 relays received video and text data from the CPU 305 to the video monitor 330 for display and, particularly, the Network Map 109 downloadable from the server 102, as will be described in greater detail below. The video monitor 330 may be a high resolution video monitor capable of displaying both text and graphics. The communication port 340 relays data between the CPU 305 and the network 101 in accordance with conventional techniques. The communication interface 340 may be any networking or interfacing device, such as a network interface card or ISDN terminal adapter. The input device 345 may be any data entry device for allowing a party to enter data, such as a keyboard, a mouse, a video camera, or a microphone.

Figure 4:
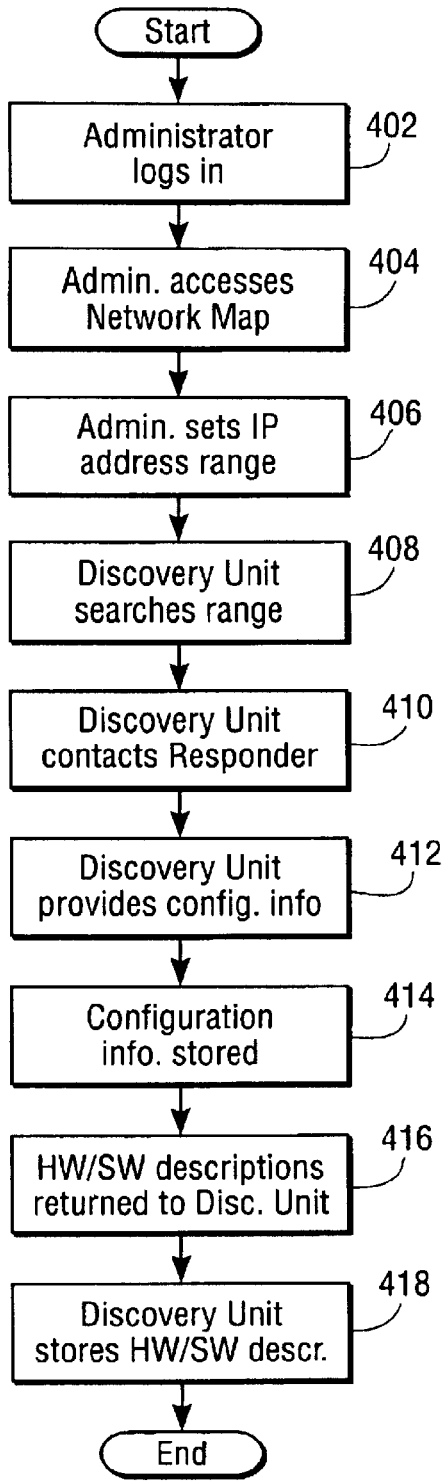
FIG. 4 is a flowchart illustrating operation of an embodiment of the invention.
Figure 5:
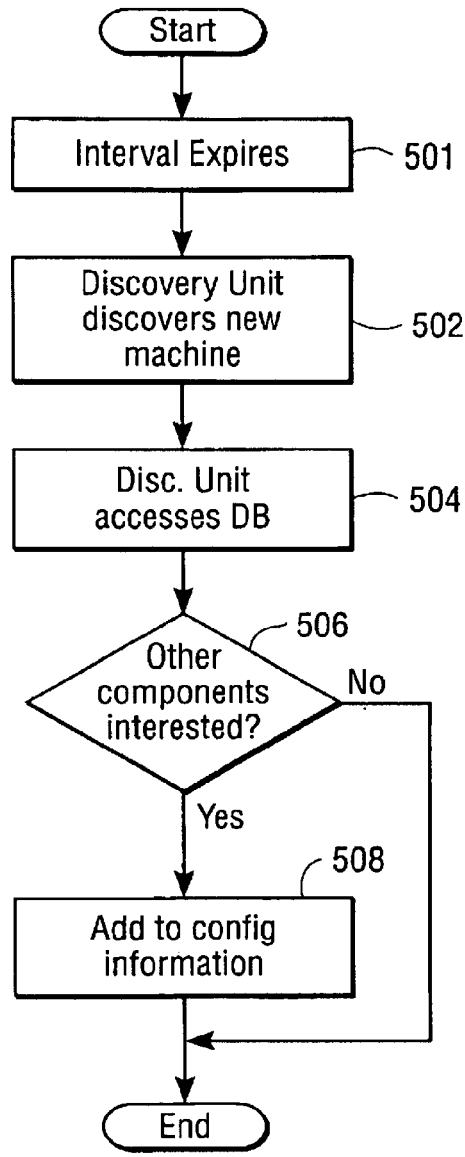
FIG. 5 is a flowchart illustrating operation of another embodiment of the invention.

Operation of the Auto-Discovery Service according to an embodiment of the present invention is illustrated more clearly with respect to FIGS. 4 and 5. In particular, FIG. 4 is a flowchart showing system operation of the Auto-Discovery Unit 104 and Responder 112 interaction. In a step 402, an administrator logs in to the Auto-Discovery Service. The administrator may do so either from a remote terminal, such as one of the computers 108, or from a terminal associated with the server 102. In a step 404, the administrator accesses the Network Map 109. As noted above, the Network Map 109 may be embodied as an HTML web page supporting Java, cgi-bin script, or Javascript. Thus, for example, the server 102's CPU 205 may download to a CPU 305 associated with a user terminal a web page readable by the CPU 205. The CPU 305 may thus support any of a variety of web browsers, such as Netscape Navigator or Microsoft Internet Explorer.

In a step 406, the administrator may input a set of IP address ranges associated with the network (e.g., using cgi-bin or similar script, or Javascript). In a step 408, the Auto-Discovery Service and particularly, the Discovery Unit 105 searches the IP address range to determine if there is a telephony device at the address. For example, the Discovery Unit 105 may do so using ping. Assuming that telephony devices are discovered, then in a step 410, the Auto-Discovery Service contacts the Responders 112 at the respective IP address locations. In a step 412, the Auto-Discovery Service provides configuration information to the respective Responders 112. The Responders 112 may, for example, be programs embodied as HTTP servers supporting cgi-bin or Javascript. In a step 414, the Responders 112 accept and store the configuration information. For example, the CPU 305 may receive the information via the communication port 340 and store the information in the information storage 370. In a step 416, the Responder 112 returns its hardware and software descriptions to the Auto-Discovery Service. For example, the objects returned may be embodied in XML format. Finally, in a step 418, the Auto-Discovery Service stores the received objects. Thus, for example, the CPU 205 receives the XML objects and stores them in the database 255.

As noted above, the Auto-Discovery Service is configured to automatically search for new components and distribute corresponding configuration information to other components. Thus, with reference to FIG. 5, in a step 501, a predetermined time interval may be input. In a step 502, the Auto-Discovery Service begins searching for components (upon expiration of the time interval). If the Auto-Discovery Service discovers one or more new components at the corresponding IP addresses, in a step 504, the Auto-Discovery Service (i.e., the CPU 205) accesses the database 255 for information concerning whether other components need to be informed of the configuration of the newly discovered components. This information may be provided by the administrator, upon system initialization. If this determination is affirmative, as made in a step 506, then in a step 508, the Auto-Discovery Service adds this information to the outgoing configuration information. Otherwise, the operation terminates.

As noted above, the various CPUs 205, 305 are programmed to implement the Auto-Discovery Service including the Discovery Unit, the Database Unit, the Network Map and the Responders. The Auto-Discovery Service according to a particular embodiment of the present invention includes three software components: a Discovery Component, a Responder Component, and a Configuration Component, implemented in object oriented code. The Discovery Component, referred to as DiscEntityServer, is a Java application that runs as a service on the server 102 that houses the central database 255 and may also include a security server (not shown).

As noted above, each machine has installed a responder component, referred to as Responder 112. The Responder 112 responds to a query by the Discovery Component, DiscEntityServer, providing it with a list of the installed software components on each ToL machine. The Responder 112 is also responsible for storing configuration data passed to it.

The Configuration Component, referred to as DiscConfig, allows the administrator to configure which range of IP addresses to search and how frequently the search should be conducted.

The Discovery Component, DiscEntityServer, periodically polls each address in a set of IP addresses to verify if there is a machine at that address with ToL (Telephony over LAN) software running on it. If so, then the machine is asked for the set of ToL software components running on the machine and the machine is provided with up to date configuration information. The Discovery Component, DiscEntityServer, persistently stores the information about the machines and software it has located. This information may be available through an RMI interface to applications such as the Network Map 109. The DiscEntityServer also includes a sub-component that updates the status of each entity based on information provided by a FaultAnalysis component.

The primary classes used by the discovery component, DiscEntityServer, are shown in FIG. 6. In particular, DiscEntityServer communicates via JDBC (Java Database Connectivity) with the configuration data (ResidueConfigStorage), and the administrative configuration data component (DiscConfigStorage). Further, the DiscEntityServer interacts with a status component (StatusMonitor), an entity manager (EntityMgr), and a locator component (EntityLocator). On startup, the DiscEntityServer checks DiscConfigStorage for what IP address ranges to search, what rates at which to rescan the network, and the time interval used in determining when to remove old components. The DiscEntityServer checks the ResidueConfigStorage to determine what configuration values are passed to the Responder. It then uses these values to initialize the EntityLocator, EntityMgr, and the StatusMonitor, which are then responsible for locating and maintaining information about the ToL software and hardware entities in the system. DiscEntityServer is responsible for registering itself and the RMI a name service as RMI servant objects. It includes the following methods: Main, setNextTimeTilRescan, and setOutofDate. The method Main is used to invoke auto-discovery and the EntityMgr. The method setOutofDate notifies that configuration is no longer valid. The method setNextTimeTilRescan sets the time period for the next forced rescan of the network.

The EntityLocator searches the set of IP address ranges to locate valid IP addresses. It then tests the valid ones to determined if they are running ToL software by attempting to communicate with the Responder 112. It also passes configuration information to the Responders 112. The EntityMgr is responsible for managing entities by providing access to them and by making them persistent. The StatusMonitor interprets messages coming from FaultAnalysis to provide status updates of Entities to the EntityMgr.

The ResidueConfigStorage is a file that contains one or more key-value pairs that are passed to the Responder by the DiscEntityServer to provide system configuration data to machines on the network. ResidueConfigStorage also holds the location where configuration information is to be stored on the Responder's machine. The file format may be as follows: <storage type> <storage name> <value name> <value>. <storage type> may be a file, database or registry. <storage name> can be a file name, a database name, or a registry key. <value name> is an identifier for the value in a file, the name of a table in a database, of the value name of the value in the registry. <value> provides the configuration value.

The DiscConfigStorage is a set of files that persistently stores the administrative configurable values related to the auto-discovery process. This includes the range of IP addresses used, the repetition rate of the discovery process, and the time until old components are removed. JDBC is the interface to access the data in the files.

The EntityLocator includes and/or uses the classes or components shown in FIG. 7. Shown components are SyncEntityLocatorImpl, ExplorationResidue, Selection Policy, NetworkEntityLocator, NetworkEntityExplorer, HTTPNetworkEntityExplorer, SingleStepSelectionPolicy, SimpleNetworkEntityLocator, NetworkEntity, ManagedEntity, AddrTester and PingAddrTester. As noted above, EntityLocator is the main interface class to the auto-discovery system and includes a mechanism for locating NetworkEntities and the ManagedEntities on them. Run either synchronously or asynchronously, EntityLocator is responsible for searching the IP addresses for a valid set of addresses, testing the valid ones to determine if they are running ToL software by attempting to communicate with the Responder, and passing configuration information to the Responders.

EntityLocator includes as fields or parameters for setState( ) an IDLE_STATE and ACTIVE_STATE fields. EntityLocator implements deletedRange, getState, newExplorationResidue, newNetworkEntity, newRange, setEntityMgr, setLocationKey, setSecurityKey, and setState methods.

The method newRange specifies a range of addresses to search over. It may read either a textual representation of an IP address or a host name. It may be called more than once to set more than one range. The method deletedRange deletes a previously added range. The method setState starts or stops the process. A ParameterException may be thrown if the state is not one of the predefined ones or if the state cannot be changed to that value yet. The method getState fetches the system state. The method setSecurityKey sets a security key. An entity will only respond to an attempt to discover it if the correct security key is passed to it in the discovery process. The method setLocationKey provides the EntityLocator with any additional information it needs in order to locate entities. The method newExplorationResidue is related to ExplorationResidue and relates to newly added configuration information. SetEntityMgr calls the EntityMgr. NewNetworkEntity is called only by classes internal to the system for creating new entities. AddrTester is the interface class for all classes that perform the network request to verify whether a host is at a given IP address. AddrTester includes a setID method and a verifyAddress method. SetID sets a unique field to help assist in verifying the connection. VerifyAddress determines if the address is valid.

The interface EntityExpirationPolicy determines when to automatically remove a Network Entity from the EntityManager or ManagedEntity from a NetworkEntity and its persistent storage.

The interface EntityMgr is responsible for creating the entities, making them persistent, and for providing access to them. It reads in the persistent entities when it is created. EntityMgr implements the following methods: getEntity, newEntity, deleteEntity, deleteEntity, deleteEntities, getEntities, newExpirationPolicy, getExpirationPolicy, and deleteExpirationPolicy. The method getEntity retrieves a particular network entity at an input address. The method newEntity adds a new entity to be managed and persistently stored. If the entity already exists, then the Entity's time stamp is updated any changes are noted. The deleteEntity method removes an Entity from being managed and stored. The deleteEntities method deletes all NetworkEntities that match provided criteria. The criteria may include all entities, only ToL entities, entities created since a specified date, and the like. The getEntities method retrieves all entities found that match the provided criteria. The newExpirationPolicy method sets a new policy by which objects are automatically removed from being managed and stored. The getExpirationPolicy method gets the policy by which entities are automatically removed from being managed and stored. The deleteExpirationPolicy method removes a policy by which entities are automatically removed from being managed and stored.

The interface NetworkEntityExplorer searches NetworkEntites for their ManagedEntities and provides the NetworkEntities with configuration information in the form of ExplorationResidues. The NetworkEntityExplorer includes the following methods: deleteExplorationResidue, getManagedEntities, newExplorationResidue, setConfigurationLocation, and setExplorationLocation. The newExplorationResidue method adds a new value to be set on the explored NetworkEntity. The deleteExplorationResidue method deletes the value from NetworkEntity. The setExplorationLocation method sets where in the NetworkEntity the Explorer should look for ManagedEntities. The setConfigurationLocation method sets where the ExplorationResidues are to be left; if not set, the ExplorationLocaton is used. The getManagedEntities method returns a vector of the ManagedEntities.

The interface SelectionPolicy is used to select the next IP address to search as a candidate for having a host at the other end. It includes the following methods: deletedRange, getNextAvailableCandidate, newRange, and setNextAvailableCandidateIndex.

The newRange method adds a new range of values to use as a selection criteria. The deletedRange method removes a range of values from being used as selection criteria. The getNextAvailableCandidate method returns the next candidate to try. The setNextAvailableCandidateIndex method sets the location at which to start looking for candidates.

The interface StatusMonitor interprets messages coming from FaultAnalysis to provide status updates of Entities to EntityMgr. It includes the methods Idle, Listening, and setState, and setEntityMgr.

The abstract class ExplorationResidue (FIG. 7) is used by the NetworkEntityExplorer to leave configuration information on a discovered entity. For example, the HttpNetworkEntityExplorer may send the residues to the web server on the discovered entity in the form of cookies. The Responder on that machine will take the cookies and store them locally as configuration values. The residue specifies the value, the name of the value, what type of storage is to be used in the discovered machine and the name of the particular storage used (e.g., file name, db, etc.).

The ExplorationResidue class includes the following fields: DB_Storage, File_Storage, and Registry_Storage. It includes the following constructor ExplorationResidue, and the following methods: getStorageName, getStorageSubName, getStorageType, getValue, and getValueName. The getValueName method is used to identify the configuration value. The getValue method provides the configuration value. The getStorageName method returns the name of the database or file or register key, etc. The getStorageSubName method specifies which of the subnames to get.

The class HttpNetworkExplorer (FIG. 7) is a class used to locate ManagedEntities and update NetworkEntities using HTTP requests. The class HttpNetworkExplorer includes three fields: The field m_locationKey indicates where the HttpNetworkEntityExplorer should look for ManagedEntities on the NetworkEntity; the field m_parent identifies a parent (i.e., which object this object is contained by); and the field m_port identifies the specific port.

The class HttpNetworkExplorer is implemented with the following methods: deleteExplorationResidue; getManagedEntities, newExplorationResidue; setConfigurationLocation; setExplorationLocation; and Update.

The newExplorationResidue method adds a new value to be set on the explored NetworkEntity. The deleteExplorationResidue method deletes a particular residue. The setExplorationLocation method sets where in the NetworkEntity the Explorer should look for ManagedElements. The update method is called when a valid host is found. The update method creates a new NetworkEntity and then searches for its ManagedEntities. The EntityMgr is then updated with the new findings. The getManagedEntities method returns a vector of ManagedEntities.

The public class ManagedEntity (FIG. 7) includes the following fields: config_url, default_url, error_status, Fault_url, not_configured_status, running_status, stopped_status, user_defined_url, and warning_status. The status fields indicate possible values for status. The URL fields indicate possible values for getMgmtURL. The class ManagedEntity includes the following methods: getDescription, getStatus, setStatus, getMgmtURL, newMgmtURL, deleteMgmtURL, getOwner, setOwner, getVersion. SetVersion, getType, setType, newChildManagedEntity, deleteChildManagedEntity, getChildManagedEntity, getParentManagedEntity, and getOther.

The public class NetworkEntity (FIG. 7) represents a host on the system. A NetworkEntity can have one or more IP addresses and none or more ManagedEntities existing in it. The class NetworkEntity implements the following methods: available_status, and unavailable_status. The class NetworkEntity includes the following objects: deleteHostName, deleteIPAddress, deleteManagedEntity, getHostName, getIPAddress, getManagedEntity, getOwner, getStatus, newHostname, newIPAdddress, newManagedEntity, setOwner, and setStatus.

The abstract class NetworkEntityLocator uses a selection policy to get the next address to test. It then tests that address. When it locates a valid host at that address, it notifies any observers that it has found an address. The class NetworkEntityLocator includes the following fields: active_state, idle_state, m_locationKey, m_securityKey, m_selectionPolicy.

The abstract class NetworkEntityLocator includes the following methods: getState, newObserver, setLocationKey, setSecurityKey, and setState. The method setState is set to active_state to start the location process. An entity will only respond to an attempt to discover it if the correct security key is passed to it in the discovery process. The method setSecurityKey sets that security key. The method setLocationKey provides the EntityLocator with any additional information it needs in order to locate the Entities.

The class SimpleNetworkEntityLocator (FIG. 7) extends NetworkEntityLocator to provide a simpler implementation. It includes the following fields: m_AddrTester, which is used to verify the address; and m_state, which tracks whether the location process is active or not. The class simpleNetworkEntityLocator includes the following methods: getState, setAddrTester, and setState. The method setAddrTester allows the user to override the default address tester. The method setState sets the sate to active to start the location policy immediately. When the function returns the state will be idle as the location process should be finished. When a NetworkEntity is found, any observers are notified. The method getState overrides the method getState in the class NetworkEntityLocator.

The class PingAddrTester (FIG. 7) implements AddrTester by using ping to verify if a host is at the given address. The class PingAddrTester includes the following fields: numRetries, and timeoutinterval. The field NumRetries indicates the number of times the class should ping an address before giving up. The field timeoutinterval sets the time interval in milliseconds the system should wait for a ping response. The class PingAddrTester includes the methods verifyAddress, setID, getValid, and Main. The method verifyAddress determines if the address is valid and implements verifyAddress in interface AddrTester. The setID method implements the setID in AddrTester, though is not necessarily used. The method getValid calls a native C method to verify if an IP address is currently associated with a live node. Finally, the method Main is a test routine.

The class SingleStepSelectionPolicy (FIG. 7) implements SelectionPolicy in a simpler implementation. It is used to select the next IP address to search as a candidate for having a host at the other end. The class includes an implementation class, SingleStepSelectionPolicy.IPRange, and the following fields: m_currentLoc, m_currentRange, and m_ranges. The field m_currentLoc points to a particular IP address in an IP range. The field m_currentRange points to a particular IpRange object in the vector. The field m_ranges holds a set of IP Ranges that are to be searched.

The newRange method adds a new range in Selection-Policy. The method deletedRange deletes a range. The getNextAvailableCandidate method implements getNextAvailableCandidate in the interface SelectionPolicy. The setNextAvailableCandidateIndex method implements setNextAvailable CandidateIndex in the interface SelectionPolicy. The getNext method returns a long representation of an IP address. The strToLongIP method converts a string IP representation to a long IP representation. The longToStrIp converts a long IP representation to a string IP representation.

The class SingleStepSelectionPolicy.IpRange sets the IP range for the Single Step Selection Policy and includes fields m_end, and m_start, and methods amLessThan, contains merge, overlaps, and tostring.

The public class SyncEntityLocatorImpl (FIG. 7) implements EntityLocator, i.e., as a synchronously executing implementation of the EntityLocator interface. The public class includes the fields m_Explorer, m_Locator, m_Mgr, and m_SelPolicy. The field m_Explorer is used to find ManagedEntities and update NewEntities with configuration information. The field m_Locator is used to test if an address is valid. The field m_Mgr is the location where found Entities are stored. The field m_SelPolicy is used to determine which address to try next.

The class includes the following methods: newExplorationResidue, setSecurityKey, setLocationKey, setLocationSubkey, setState, getState, newRange, deletedRange, setEntityMgr, and newNetworkEntity. NewExplorationResidue, setSecurityKey, setLocationKey, setLocationSubkey are implemented in EntityLocator. SetState is used to start or stop the system, though newRange should be called at least once first. The location policy is used first to find valid hosts then entities are created. GetState returns the state of the EntityLocator. NewRange adds a new range of IP addresses to be searched over. DeletedRange may or may not be implemented. SetEntityMgr sets the object that located Entities are provided to. NewNetworkEntity is called when objects used by the class locate a new Entity, and provides that entity to the EntityMgr. Main is an audit routine. The public class ParameterException includes the field m_which identifies the exception and the method parameterNumber.

FIG. 8 illustrates the expected flow of messages upon starting the DiscEntityServer and the pattern for executing the discovery process. Each time the DiscEntityServer sets the EntityLocator into an active state (using setState (811, 815, 816), the location process occurs. When setState returns, the DiscEntityServer waits a time interval (read from DiscConfigStorage) until resetting the EntityLocator into an active state. This repeats indefinitely.

The number of each message is variable. The SELECT (801, 802), INSERT, DELETE methods on the storage components are indicative of the JDBC/SQL interface to them and correspond respectively to retrieving, adding, and removing data from the storage item. Thus, the DiscEntityServer retrieves the range of IP addresses to search from the DiscConfigStorage and the configuration values to be passed to the Responders from the ResidueConfigStorage.

The DiscEntityServer then sets an ExpirationPolicy (803). The DiscEntityServer then inititalizes the interface EntityExpirationPolicy, to determine when to remove a NetworkEntity from the EntityManager or a ManagedEntity from a NetworkEntity and its persistent storage. Next, the DiscEntityServer initializes the EntityMgr (804), the EntityLocator (805), and the StatusMonitor (806). Once the initializations have occurred, the DiscEntityServer sets one or more newRanges (808–810) in the EntityLocator, defines one or more newNetworkEntities (812–814), and activates the system, using one or more setStates (815–816).

As seen in FIG. 9, the values taken from the ResidueStorage are used to create new ExplorationResidues that are passed to the EntityLocator. The EntityLocator forwards these values to the HttpNetworkEntityExplorer. It uses these values to provide configuration information to the Responders. More particularly, FIG. 9 is a diagram illustrating flow for initialization of the EntityLocator implementation class SyncEntityLocatorImpl. Initially, SyncEntityLocatorImpl accesses EntityMgr (901) as described above and provides the SingleStepSelectionPolicy (902). The SyncEntityLocatorImpl then initializes the NetworkEntityLocator (903), the PingAddrTester (905), and the HttpNetworkEntityExplorer (904). The SyncEntityLocatorImpl then provides a newRange (906) to the SingleStepSelectionPolicy and activates the process with a setState (907) to the NetworkEntityLocator.

Turning now to FIG. 10, a diagram of the sequence of events following the setState (ACTIVE) call in FIG. 9 is shown (i.e., an iteration in the location process). The NetworkEntityLocator sends a getNextCandidate (1001) to the SingleStepSelectionPolicy. Then, a VerifyAdress is sent to the PingAddrTester (1002). If verifyAddress returns true (i.e., a NetworkEntity is located at the address), then setChanged (1003) is activated. Next, the HttpNetworkEntityExplorer is updated (1004). The HttpNetworkEntityExplorer sends a getManagedEntites (1005) and then provides the newNetworkEntity (1006) to the EntityMgr.

FIG. 11 illustrates the message sequence used to update the status of a particular ManagedEntity. Initially, the DiscEntityServer causes the StatusMonitor to activate and wait (1101). Then, a new status message may be received from the FaultAnalysis (1102). Then, the StatusMonitor issues a getNetworkEntity to the EntityMgr (1103), a getManagedElement to the NetworkEntity (1104) and setStatus to the ManagedEntity (1105).

As discussed above, each telephony device includes a responder. The Responder may be an ASP (and some COM objects) that is processed by the PWS or IIS 4.0 running on the target machine. Installation of each machine using ToL software ensures that PWS or IIS 4.0 is installed. The web servers may be set to use port 80 (the default HTTP port) and may be configured to start automatically when the machine is stated.

The Responder has the following behavior: When a HTTP POST request is made against that page, the ASP files stores the posted data and returns a text file that contains information about the set of ToL components installed on that machine. The information about the set of ToL components is stored in the registry during installation. The ASP uses a COM object to access the registry.

The POST request also provides configuration information. If the information is specified to be stored in the registry, this information is stored there using the same COM object as mentioned above. The ABOBC COM object available with PWS and IIS is used for information to be stored in a database and the file I/O available in ASPs is used to write configuration information destined for a file.

In one embodiment, in order for the Responder to accept any new configuration information, it must check the credential (i.e., authorization to change the configuration). The POST contains this data either directly or via a cookie. The Responder contains the information necessary to do this. In another embodiment, the information about the ToL component is always returned and no check of the credential is made with the security server.

The interaction diagram in FIG. 12 shows the interactions need for an update of configuration information to be made. Initially, the DiscEntityServer obtains a credential (i.e., authorization to change the configuration) with the SecurityServer (1201). Then, the POST containing the Configinfo and the Credential is provided to the Responder (1202). The Responder checks the credential and, if authorized, updates the configuration (1203, 1204). The Responder then returns its ComponentInfo to the DiscEntityServer (1205).

As discussed above, one aspect of the present invention is a Network Map and graphical user interface. A diagram of the DiscConfig module's user interface structure is shown in FIG. 13. The diagram of FIG. 13 shows the sub-components of DiscConfig and the protocols they use to communicate with other parts of the system to propagate changes made by the administrator. Shown are the interactions of the DiscConfigUI with a DiscConfigMgr, DiscConfigChangeNotifier, DiscEntityServer, and DiscConfigStorage.

The DiscConfigUI is an HTML form based user interface that allows the administrator to configure inputs to the Auto-Discovery Application. This includes the ranges of IP address that should be searched, the repetition rate of the discovery process, and the time until old components (i.e. ones that haven't been discovered recently) are removed. According to one embodiment, the DiscConfigUI includes JavaScript for insuring that the user can only enter reasonably valid parameters.

The DiscConfigMgr is an ASP that generates the DiscConfigUI and updates the DiscConfigStorage with new configuration information. It validates all user-provided information before updating the DiscConfigStorage and posts error messages back to the user interface in the event of an invalid parameter. It also starts the DiscConfigChangeNotifier to notify the Application of changes in configuration information.

The DiscConfigChangeNotifier is a short-lived process used to notify the Application of charges in configuration. It provides a simple bridge between the DiscConfigMgr which is an ASP file and the Application which is a Java application.

The sequence diagram in FIG. 14 outlines the expected interaction of the DiscConfig components after an administrator changes the configuration information through the user interface. Initially, the Administrator sets a newRange (1401), sending the IP address range to the DiscConfigUI, as well as setting the iteration rate (1402), using the command setIterationRate. These are sent to the DiscConfigUI using the submit command (1403). This information is POSTed from the DiscConfigUI to the DiscConfigMgr (1404). The DiscConfigMgr reads the newRange (1405) and then inserts it into the DiscConfigStorage (1406). The DiscConfigMgr also reads the refresh rate (1407) and inserts it into the DisconfigStorage (1408). Next, the Main program is initialized by way of the DiscConfigChangeNotifier (1409). The DiscConfigChangeNotifier then sends a setOutofDate command (1410) to the DiscEntityServer, which replies with a pair of SELECT commands (1411, 1412). As discussed above, the user interface employs a Network Map 109. The Network Map allows a view of the hardware and software entities found by Auto-Discovery. The Network Map provides links to an associated configuration and event reporting page for each entity. It also displays the status of each element. The Network Map has two functional units—the ASP file that generates an HTML form and an applet in the HTML form that displays the entities and their summary information. The applet gets information about the entities by using RMI to communicate to the EntityMgr component of the DiscEntityServer.

The directory applet provides a directory-like view of the components of the system. It also provides the functionality to refresh the display to get "up to date" component status information, clear all elements from the "database", and rescan the network to update the "database" of elements. Each of these features is available through a button.

Clicking on an Entity's icon in the directory results in summary information being displayed in the summary frame. Using links in this frame, the administrator can select to navigate to the configuration screen or the event reporting screen for that Entity.

According to one embodiment, the directory has two (level 1) subdirectories off of the root, software view and hardware view. The hardware view shows each (level 2) subdirectory graphically as either a server machine or a workstation/PC and textually identifies each with an IP address and hostname. These (level 2) subdirectories are ordered alphabetically by machine name. The (level 3) subdirectories show the software components installed on each machine. The (level 3) subdirectories are representative of their functions and their labels indicate their functionality. The client software is an exception to this labeling rule in that its label indicates its primary user. A color icon representing an Entity depends on the status of that Entity.

FIGS. 19A–19E illustrate an exemplary user interface according to the present invention. In particular, the user interface 5000 as shown is an HTML page viewable in a Web browser such as Netscape Navigator. According to the embodiment illustrated, the graphical user interface 5000 includes a Navigation frame 5006, a Directory frame 5004 (including the actual hierarchical tree), a Summary frame 5002, and a Commands frame 5008. The Navigation frame 5006 allows the user to log in and out, view the network, view events, and conduct system administration tasks and user administration tasks, by clicking the appropriate hypertext.

The Commands frame 5008 allows the user to perform a variety of functions, including Refresh, Rescan, and Status. The Refresh button 5018 allows the user to refresh the view of the map shown in the Directory frame 5004. The Rescan button 5020 allows the user to rescan the network. Finally, the Status button 5022 shows the user the current system activity status. The Summary frame 5002 shows the user a variety of summary information, such as the identity of the entity, its type, IP address, current status, and the like.

Figure 19A:
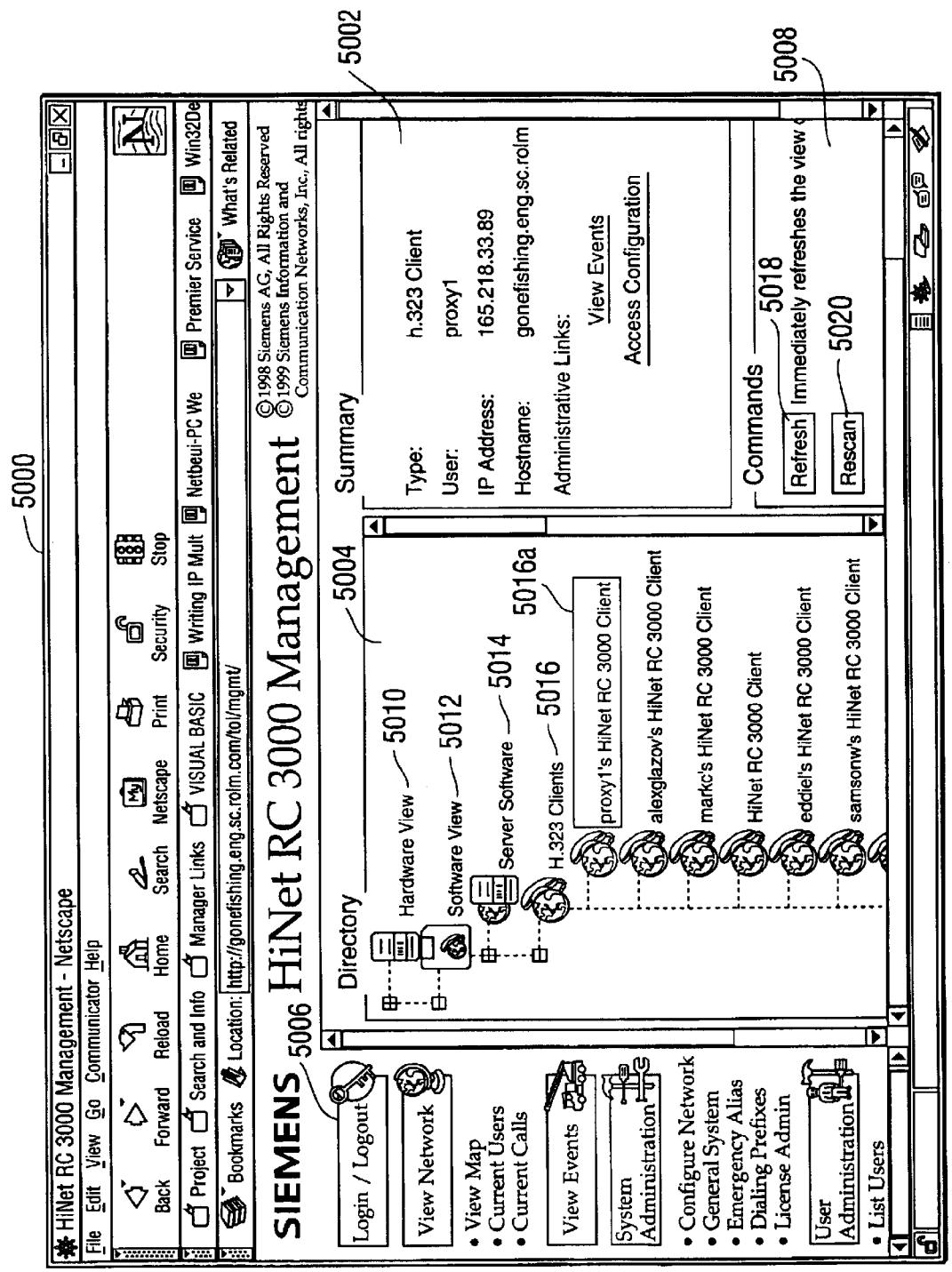
FIGS. 19A–19E are diagrams of an exemplary graphical user interface according to an embodiment of the invention.
Figure 19B:
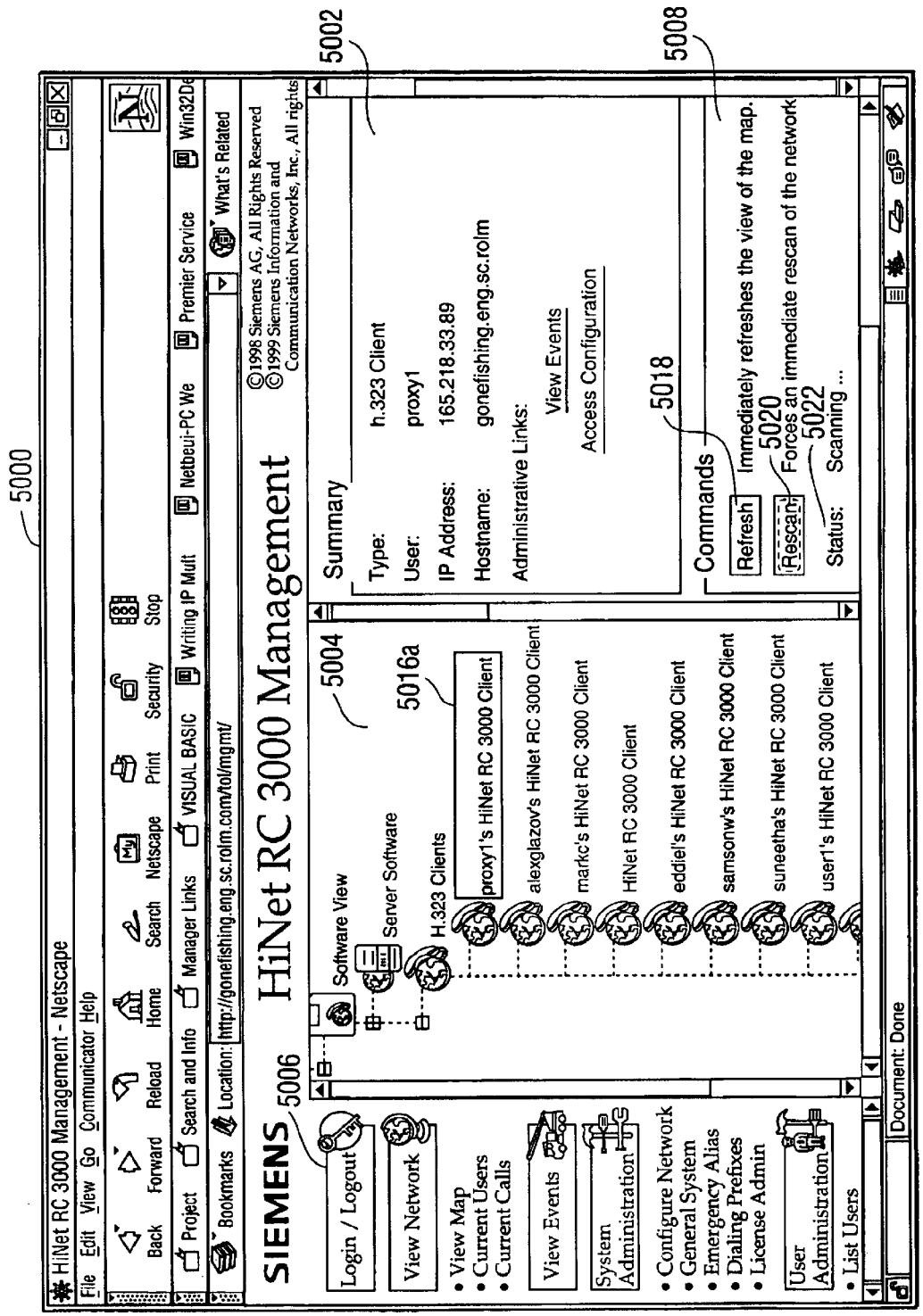
Figure 19C:
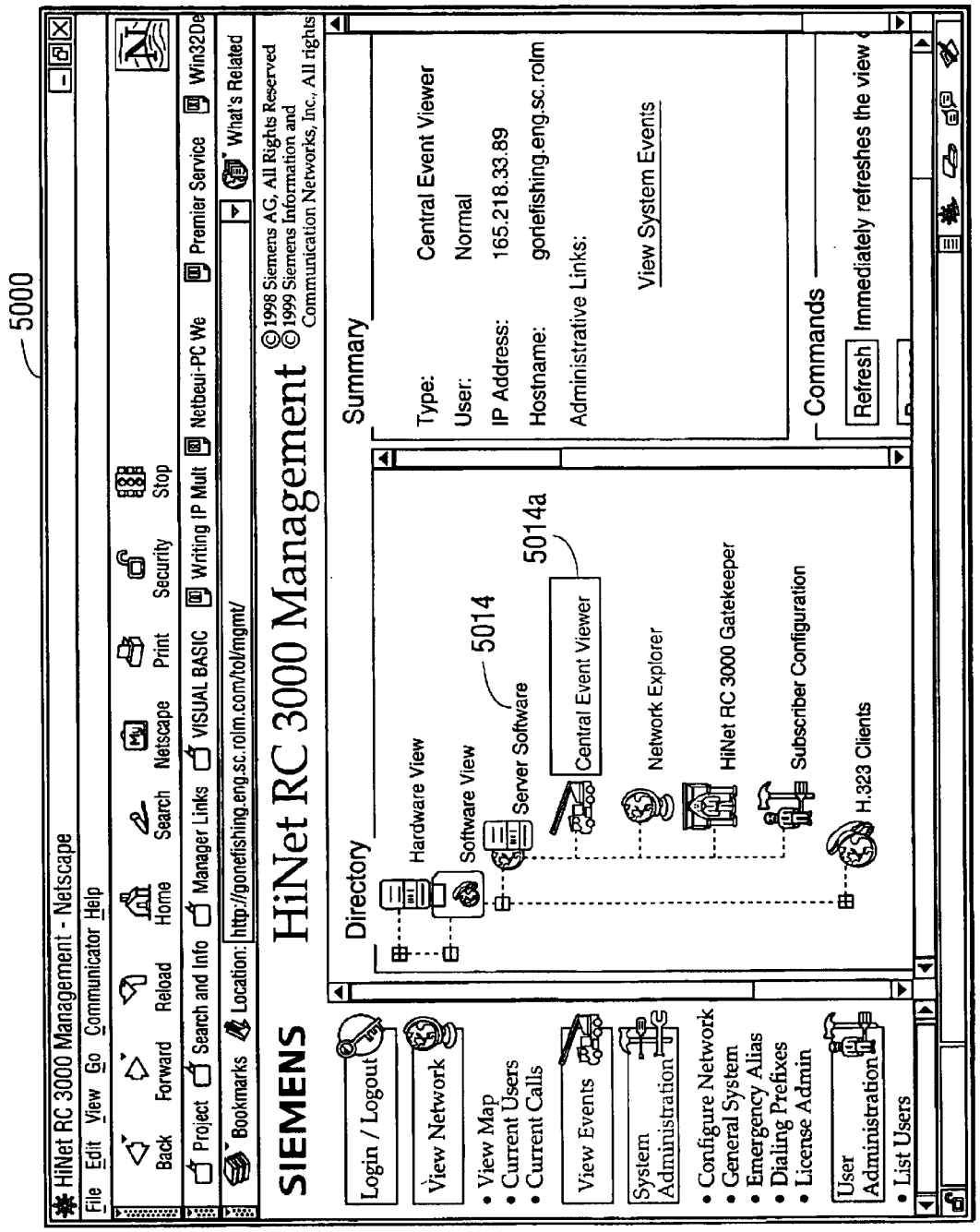
Figure 19D:
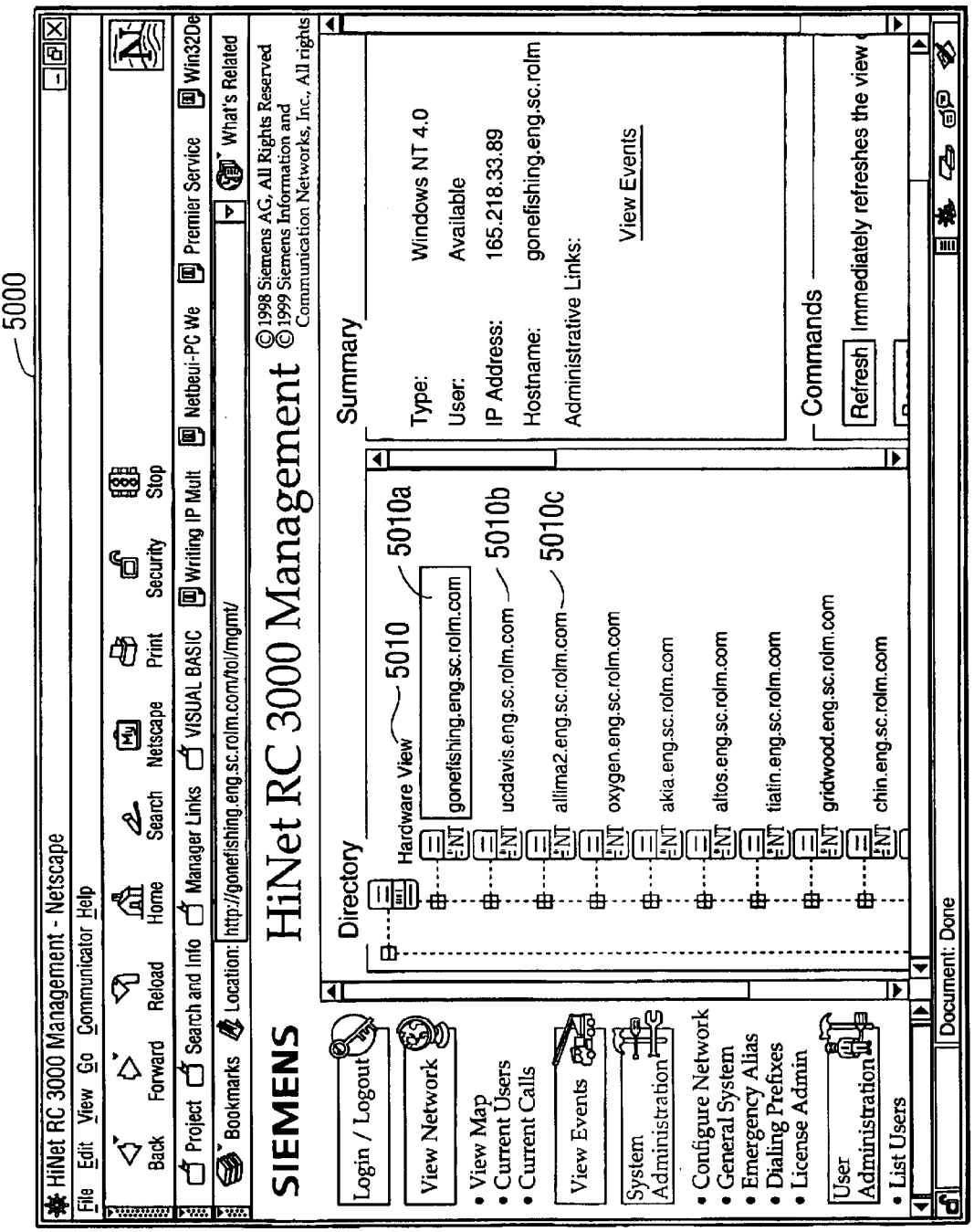

Finally, the actual Network Map is viewable in the Directory frame 5004. As shown in FIGS. 19A and FIG. 19B, the Directory frame 5004 allows the user to view, in hierarchical format, either a hardware view 5010 or a software view 5012 of the system. As shown, the software view tree includes a software server branch 5014 and an H.323 clients branch 5016. A particular client 5016a is highlighted, with summary information being displayed in the Summary frame 5002. Clicking on the particular client 5016a will allow the user to configure the client. Similarly, FIG. 19C illustrates a further branch of the Server Software 5014 and, particularly, the Central Event Viewer 5014a. FIG. 19D shows the expanded Hardware View branch 5010, including, for example, individual servers or devices 5010.

Figure 19E:
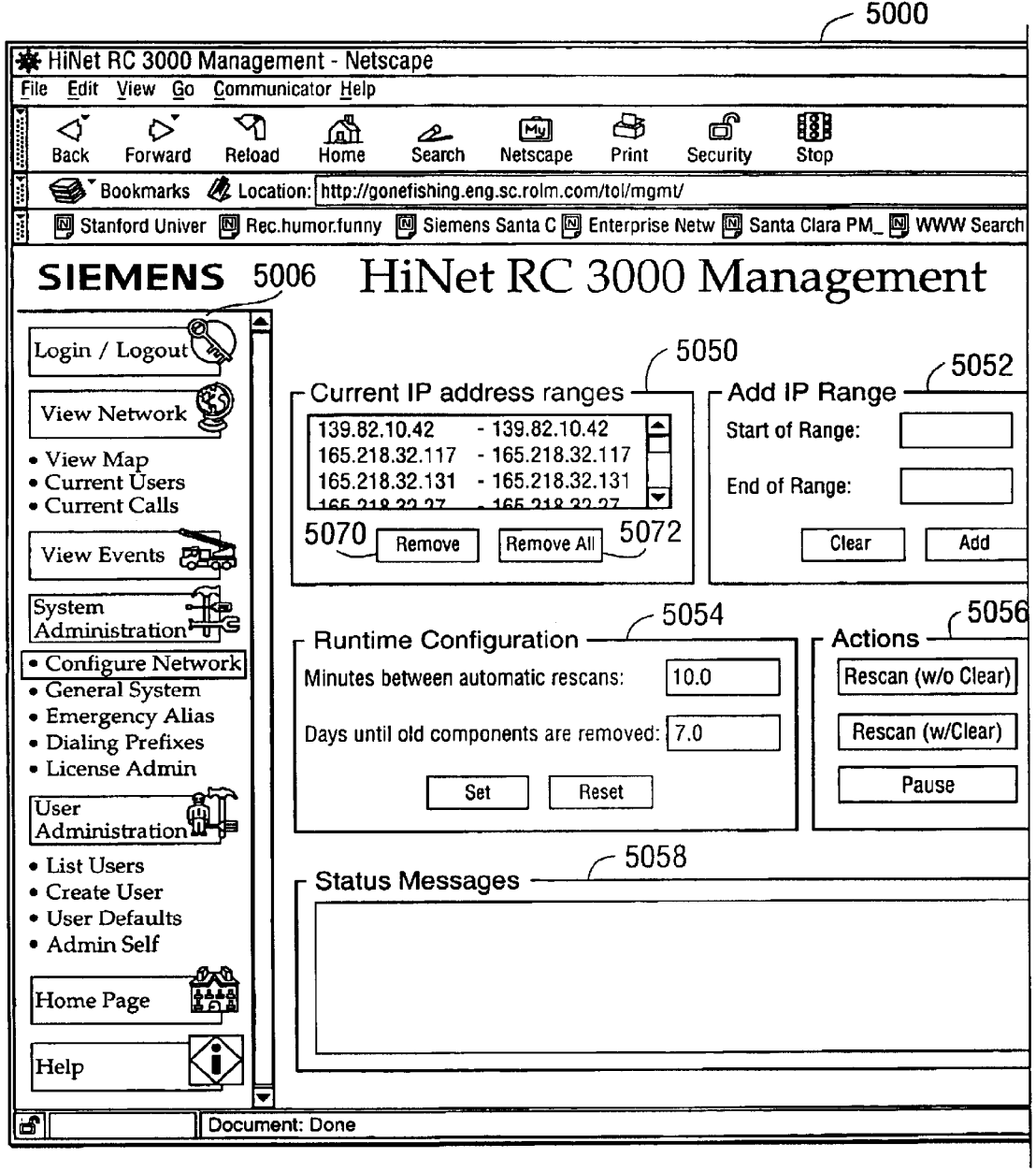

Finally, FIG. 19E illustrates the user interface which allows an administrator to input IP address ranges. As shown, a current IP address range window 5050 allows the user to view present settings, with buttons 5070 and 5072 allowing particular functions to be performed (i.e., remove or remove all of the selected ranges). The GUI further includes an Add IP Range window 5052 which allows the user to input start and end IP addresses, which are then searched according to the present invention.

The GUI further includes a Runtime Configuration window 5054 which allows the user to set automatic rescan and removal times. Further, an Actions window 5056 permits the user to undertake particular actions, such as Rescan without clearing, Rescan with clearing, and Pause. Finally, a Status Messages window 5058 is provided, to allow the user to view any status messages.

FIG. 15 shows the messages that start the Network Map user interface. The Browser initiates the applet that then builds the GUI using Swing Set and AWT components. More particularly, the Browser initializes the Directory Applet using the init( ) command (1501). The Directory Applet causes the activation of the Directory Viewer, through use of the DirectoryViewero command (1502). The Directory Viewer then activates a Panel (Jpanel)(1503) and a Scroll Panel (JScrollPanel( ))(1504). The Directory Viewer further allows additional information to be incorporated into JscrollPaneo (1505). Next, the Directory Viewer generates the Scan, Clear and Refresh buttons (1506, 1507, 1508).

In addition to laying out the GUI, initialization also includes setting up the JTree (i.e., the directory tree in the Directory frame 5004), as shown in FIG. 16. This includes setting the TreeCellRenderer, setting the TreeSelectionListener, and adding the root node. Additionally, a hardware view node and a software view node are added to the root node (not shown). After these two initialization steps, the JTree is added to the JScrollPane (not shown).

In particular, the Browser initializes the Directory Applet (init( )) (1601), which activates the Directory Viewer (DirectoryViewer( )) (1602). The Directory Viewer then activates the TreeCellRenderer (EntityTreeCellRenderer( )) (1603). The Directory Viewer also adds the root node (DefaultMutableTreeNode( )) (1604). The Directory Viewer then sets the EntityRepTreeSelectionListener (1605), which notifies the directory applet of the changes in the JTree. The TreeSelectionListener is then added to the Jtree (1606), and sets the root node (Jtree(Root)) (1607) and finally, sets the cell renderer (SetCellRenderer) (1608).

After the GUI layout components are established and the JTree initialized, the leaves of the JTree component (i.e. the Entities in the system) are added. This is accomplished by retrieving the list of NetworkEntities from the DiscEntityServer. For each NetworkEntity in the list, an EntityRep is created for it. An EntityRep provides graphical (e.g., icon and color) information for a TreeNode. The EntityRep is passed into a new DefaultMutableTreeNode; this is added to the hardware view tree node off of the root node. A similar process is applied for the ManagedEntities of this NetworkEntity and the new TreeNodes are added as leaves of the NetworkEntity's TreeNode. The software view tree is constructed in a similar fashion.

More particularly, turning now to FIG. 17, the Directory Applet activates the Directory Viewer (setState(ACTIVE)) (1701). The Directory Viewer periodically refreshes, to add new information (1702). The Directory Viewer then gets NetworkEntities from the EntityMgr (getNetworkEntity) (1703). Next, using the NetworkEntities, the Directory Viewer builds the Tree (buildTree) (1704). The previous DefaultMutableTreeNode is removed (1705), and the EntityRep is activated (1706). A new DefaulMutableTreeNode is then set (1707) and added to the leaves of the NetworkEntitiy's TreeNode (1708).

FIGS. 18A–C illustrate the interactions of the Administrator with the applet components. In particular, in FIG. 18A, pressing (1801) the refresh button 5018 (FIG. 19) in the Network Map causes the Network Map to getNetworkEntities in the EntityMgr (1802). Pressing (1803) rescan 5020 causes the Network Map to command the DiscEntityServer to setNextTimeTilRescan (1804, FIG. 18B). Finally, pressing (1805) the clear button causes the Network Map to deleteNetworkEntites (1806, FIG. 18C).

What is claimed is:

1. A network management system, comprising:

a network;

a plurality of telephony devices coupled to said network; and a server said server including an auto-discovery unit configured to make a determination of the presence of configurable components associated with said plurality of telephony devices on said network by communicating with said telephony devices, said server further configured to provide a graphical user interface (GUI) based network map of said configurable components, wherein said server is further configured to automatically determine which others of said configurable components is interested in configuration information associated with said configurable components and automatically propagate said configuration information to said others of said configurable components.

2. A network management system according to claim 1, said auto-discovery unit configured to automatically make said determination of said presence of said configurable components and propagate said configuration information to said others of said plurality of telephony devices at predetermined intervals.

3. A network management system according to claim 2, wherein said auto-discovery unit is accessible from a device on said network.

4. A network management system according to claim 1, said plurality of telephony devices including responder units, said responder units configured to provide said configuration information to said auto-discovery unit and to receive updated configuration information from said auto-discovery unit.

5. A network management system according to claim 4, said responder units comprising HTTP (hypertext transfer protocol) servers.

6. A network management system according to claim 5, said responder units comprising cgi-bin like programs.

7. A network management system according to claim 8 wherein said responder units are configured to provide said configuration information to said auto-discovery unit in XML format.

8. A network management system according to claim 2, wherein said graphical user interface comprises a Java applet.

9. A network management system according to claim 2, wherein said graphical user interface comprises a dynamic HTML page.

10. A method for managing a network including a plurality of telephony devices, comprising:

automatically determining the presence of configurable components associated with said plurality of telephony devices;

receiving configuration information from said plurality of telephony devices;

automatically determining which others of said plurality of telephony devices is interested in said configuration information of said plurality of telephony devices;

automatically propagating said configuration information to said others of said plurality of telephony devices at predetermined intervals; and displaying a map of said configurable components.

11. A method according to claim 10, wherein said determining the presence of said configurable components comprises using ping.

12. A method according to claim 10, wherein said receiving configuration information comprises receiving said configuration information in HTTP format.

13. A method according to claim 10, wherein said displaying a map comprises providing a graphical user interface for entering configuration information.

14. A method according to claim 13, wherein providing said graphical user interface comprises providing an HTML page.

15. A network management system, comprising:

a network;

a plurality of telephony devices coupled to said network; and a server, said server including an autodiscovery unit configured to automatically search for new components and distribute corresponding configuration information to other components, and further wherein said server is configured to determine whether other components need to be informed of the configuration of the newly discovered components and automatically distribute said configuration information to said other components.

* * * * *